(12) United States Patent
Kawada

(10) Patent No.: US 8,607,055 B2
(45) Date of Patent: Dec. 10, 2013

(54) SCANNED DOCUMENT MANAGEMENT SYSTEM

(75) Inventor: Jun Kawada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1559 days.

(21) Appl. No.: 11/735,563

(22) Filed: Apr. 16, 2007

(65) Prior Publication Data

US 2007/0250714 A1    Oct. 25, 2007

(30) Foreign Application Priority Data

Apr. 25, 2006  (JP) .................................. 2006-120914
Apr. 3, 2007   (JP) .................................. 2007-097531

(51) Int. Cl.
*H04L 9/00*    (2006.01)

(52) U.S. Cl.
USPC .......................................... 713/175; 382/306

(58) Field of Classification Search
USPC ............................ 283/17; 382/306; 726/1, 26
See application file for complete search history.

(56) References Cited

U.S. PATENT DOCUMENTS

| | | | |
|---|---|---|---|
| 6,907,528 B1 * | 6/2005 | Bunn ............................ | 713/179 |
| 2004/0169366 A1 * | 9/2004 | Duffell et al. ................... | 283/17 |
| 2005/0171914 A1 * | 8/2005 | Saitoh ............................ | 705/51 |
| 2005/0178841 A1 * | 8/2005 | Jones et al. .................... | 235/468 |
| 2006/0218404 A1 * | 9/2006 | Ogura ........................... | 713/178 |
| 2007/0177824 A1 * | 8/2007 | Cattrone et al. .............. | 382/306 |
| 2008/0002243 A1 * | 1/2008 | Cowburn ...................... | 358/498 |

FOREIGN PATENT DOCUMENTS

| | | |
|---|---|---|
| CN | 1707496 A | 12/2005 |
| JP | 2001-103191 | 4/2001 |
| JP | 2004-13287 | 1/2004 |
| JP | 2004-185396 | 7/2004 |
| JP | 2004-252953 | 9/2004 |
| JP | 2004-310463 | 11/2004 |
| JP | 2005-166024 | 6/2005 |
| JP | 2005-174302 | 6/2005 |

OTHER PUBLICATIONS

Office Action issued Jun. 7, 2011 in Japanese Patent Application No. 2007-097531.

* cited by examiner

*Primary Examiner* — Jeffrey Pwu
*Assistant Examiner* — Samuel Ambaye
(74) *Attorney, Agent, or Firm* — Oblon, Spivak, McClelland, Maier & Neustadt, L.L.P.

(57) ABSTRACT

A scanned document management system for managing a paper document in a state in which the paper document is scanned and transformed into electronic data, registers an attribute of the document by a manager; when printing out the document, registers identification information of the document with correspondence to the attribute, issues a document authentication representing certificate including the identification information, coding the document authentication representing certificate and prints out the same with including the same in a document image; and, when scanning the document, extracts the coded document authentication representing certificate from the document, obtains the attribute from the identification information included in the document authentication representing certificate to determine whether or not authentication is possible therewith, and allows transfer of the document image thus scanned, when the authentication is possible.

20 Claims, 20 Drawing Sheets

FIG.10

| DOCUMENT ID | DATE/TIME | PROCESSING SERVICE | PROCESSING METHOD | REQUESTING USER |
|---|---|---|---|---|
| doc_1234 | 2006/2/16 13:00 | DOCUMENT MANAGEMENT PART | GetDoc | UserA |
| doc_2345 | 2006/2/16 14:00 | DOCUMENT CONVERTING PART | Convert | UserB |
| doc_3456 | 2006/2/16 15:00 | USER EXTENDING PART | Print | UserC |

…

SCANNED DOCUMENT MANAGEMENT SYSTEM

BACKGROUND OF THE INVENTION

1. Field of the Invention

The present invention relates to a scanned document management system for managing a paper document in a state in which it is scanned and thus is transformed into electronic data.

2. Description of the Related Art

FIG. 1 shows a general outline of a scanned document management system in the related art. In this system, an MFP (Multi Function Printer) 1, an authentication system 2 and a document management system 3 are provided. It is noted that, the authentication system 2 and the document management system 3 are those which are, in general, provided in a form of Web services.

In FIG. 1, when a user U scans a paper document D by means of the MFP 1 and delivers (transfers) the same to the document management system 3, the following operation is carried out.

That is, first, the user U requests the MFP 1 for user authentication with a user ID, a password and so forth (Step S1), the MFP 1 requests the authentication system 2 for user authentication (Step S2), and, when the authentication is succeeded in, an authentication ticket is issued (Step S3).

Next, the MFP 1 transmits the authentication ticket to the document management system 3, requests the same for authentication (Step S4), and the document management system 3 transmits the authentication ticket to the authentication system 2 to request the same for authentication (Step S5). Then, when the authentication ticket is determined as proper, the fact that the authentication is thus succeeded in is returned to the MFP 1 (Steps S6, S7), and thus, the fact that the authentication is thus succeeded in is informed of to the user U (Step S8).

Thereby, actual scanning and delivery of the paper document D is allowed (Step S9), the paper document D, which is then scanned and thus transformed into electronic document data, is delivered to the document management system 3 from the MFP 1 (Step S10).

Details of such authentication with the authentication ticket are disclosed by Japanese Laid-Open Patent Applications Nos. 2005-174302, 2005-166024, 2004-252953 and 2004-185396, for example.

SUMMARY OF THE INVENTION

The scanned document management system in the related art described above may have the following problems:

(1) When scanning and delivery of document data is thus made from the MFP 1 to the document management system 3, the user authentication is required previously by means of the authentication system 2, and the user authentication may be troublesome.

(2) Regardless of the actual contents of the document D to be thus scanned, a user right higher than a predetermined level may be required for the user authentication, the user U who is thus allowed to carry out the scanning operation is thus limited, and thus, actual work may be obstructed in some cases.

(3) When the plurality of MFPs 1 and/or the plurality of document management systems 3 exist, usage restriction from the term of validity, usable service and so forth may not be managed in a standardized manner.

(4) Similarly, when the plurality of MFPs 1 and/or the plurality of document management systems 3 exist, usage history, log inspection and so forth may not be managed in a standardized manner.

The present invention has been devised in consideration of these possible problems, and an object of the present invention is to provide a scanned document management system by which, user authentication is made not necessary, and also, even when a plurality of apparatuses or systems exist, standardized management is made possible.

In order to achieve the above-mentioned object, according to the present invention, a scanned document management system for managing a paper document in a state in which the paper document is scanned and transformed into electronic data, has a part of registering an attribute of the document by a manager; a part of, when printing out the document, registering identification information of the document with correspondence to the attribute, issuing a document authentication representing certificate including the identification information, coding the document authentication representing certificate and printing out the document image with the document authentication representing certificate included in the document image; a part of, when scanning the document, extracting the coded document authentication representing certificate from the document, obtaining the attribute from the identification information included in the document authentication representing certificate to determine whether or not authentication is possible therewith, and allowing transfer of the document image thus scanned, when the authentication is thus possible.

Thus, the document authentication presenting certificate is issued in document unit when the document is printed based on the attribute of the document managed in a standardized manner, the document authentication presenting certificate of the document is then used when the document is scanned, and also, usage history is managed in a standardized manner. As a result, user authentication is made not necessary, and also, management in a standardized manner is achievable even when a plurality of apparatuses or systems exist.

BRIEF DESCRIPTION OF THE DRAWINGS

Other objects and further features of the present invention will become more apparent from the following detailed description when read in conjunction with the accompanying drawings:

FIG. 10 shows an example of a log indicating a document usage history;

DETAILED DESCRIPTION OF THE PREFERRED EMBODIMENTS

Figure 1:
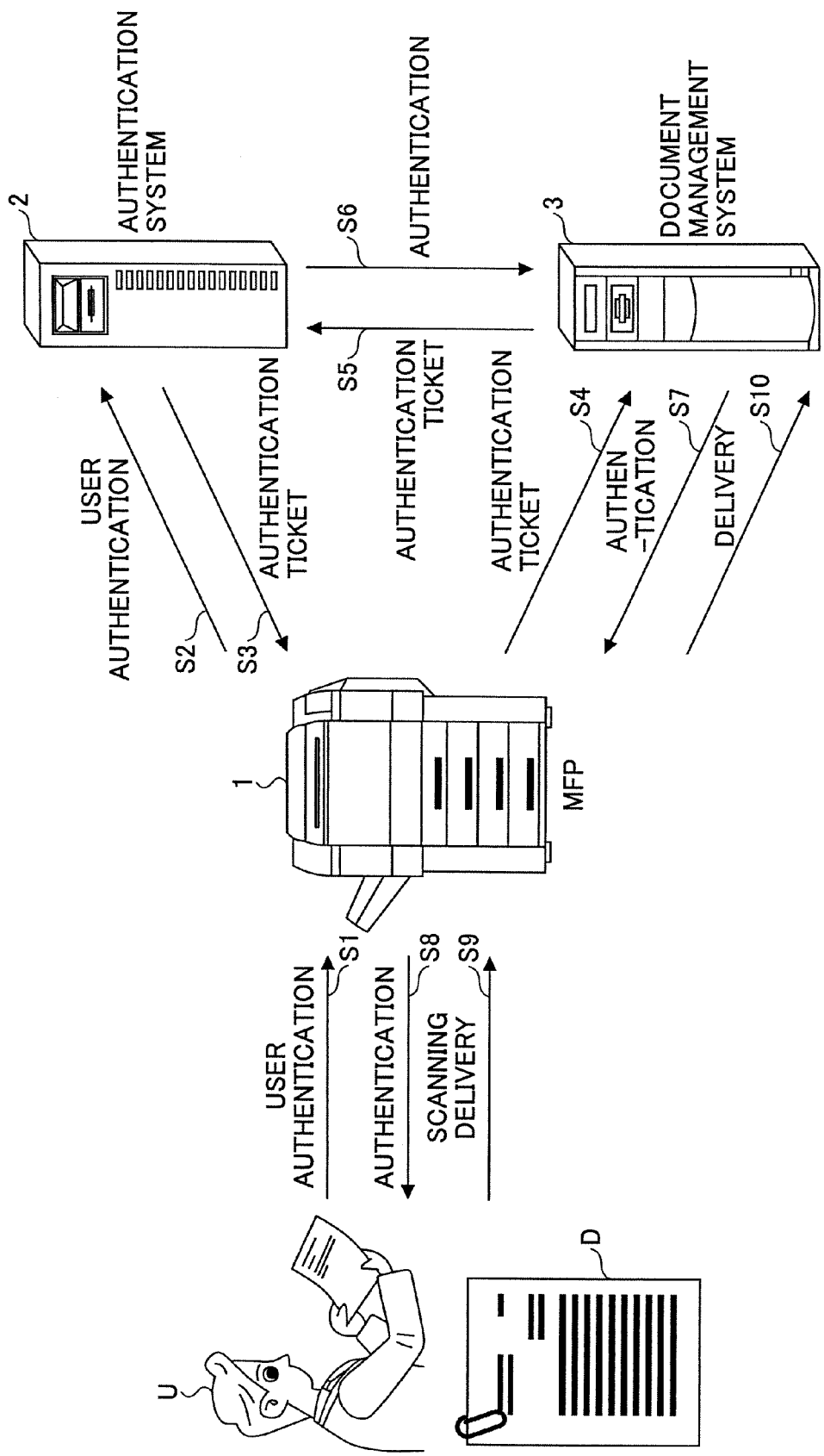
FIG. 1 shows a general outline of a scanned document management system in the related art.

According to an embodiment of the present invention, a scanned document management system for managing a paper document in a state in which the paper document is scanned and transformed into electronic data, has a part of registering an attribute of the document by a manager; a part of, when printing out the document, registering identification information of the document with correspondence to the attribute, issuing a document authentication representing certificate including the identification information, coding the document authentication representing certificate and printing out the document image with the document authentication representing certificate included in the document image; a part of, when scanning the document, extracting the coded document authentication representing certificate from the document, obtaining the attribute from the identification information included in the document authentication representing certificate to determine whether or not authentication is possible therewith, and allowing transfer of the document image thus scanned, when the authentication is thus possible.

In this system, a part of managing a history of printing and scanning the document may be further provided.

In this system, the attribute may be a document category, a target service and the term of validity, and the transfer is allowed when the time of the authentication is within the term of validity, and the document category and the target service are those for which the transfer is allowed.

In this system, a part of carrying out user extending processing in response to the transfer of the document image allowed from the authentication may be further provided.

In this system, a part of absorbing a difference in a communication protocol or such in transmission/reception of information may be further provided.

Further, the present invention described above may be realized in a form of a multi-function printer.

Further, the present invention described above may be realized in a form of a scanned document managing method.

Further, the present invention described above may be realized in a form of a scanned document managing program.

Thus, the document authentication presenting certificate is issued in document unit when the document is printed based on the attribute of the document managed in a standardized manner, the document authentication presenting certificate of the document is then used when the document is scanned, and also, a usage history is managed in a standardized manner. As a result, user authentication is made not necessary, and also, management in a standardized manner is achievable even when a plurality of apparatuses or systems exist.

With reference to figures, embodiments of the present invention will be described in detail.

FIGS. 2 through 5 show configuration examples of a scanned document management system according to one embodiment of the present invention. It is noted that, here, examples will be described in which, a QR code which is a two-dimensional code or a tint block is printed on a paper document, and thus, information of a document authentication presenting certificate according to SAML (Security Assertion Markup Language) which is a single sign-on authentication protocol with the use of Web (which is an XML (Extensible Markup Language) data exchange method using HTTP (Hyper Text Transfer Protocol) and used when a plurality of servers share authentication information) is included in a paper document. However, instead of the QR code or the tint block, another code system may be applied. Also, instead of the document authentication presenting certificate according to SAML, a conventional authentication ticket, a Kerberos ticket or such (any system may be applied as long as authentication information can be exchanged) may be applied.

Figure 2:
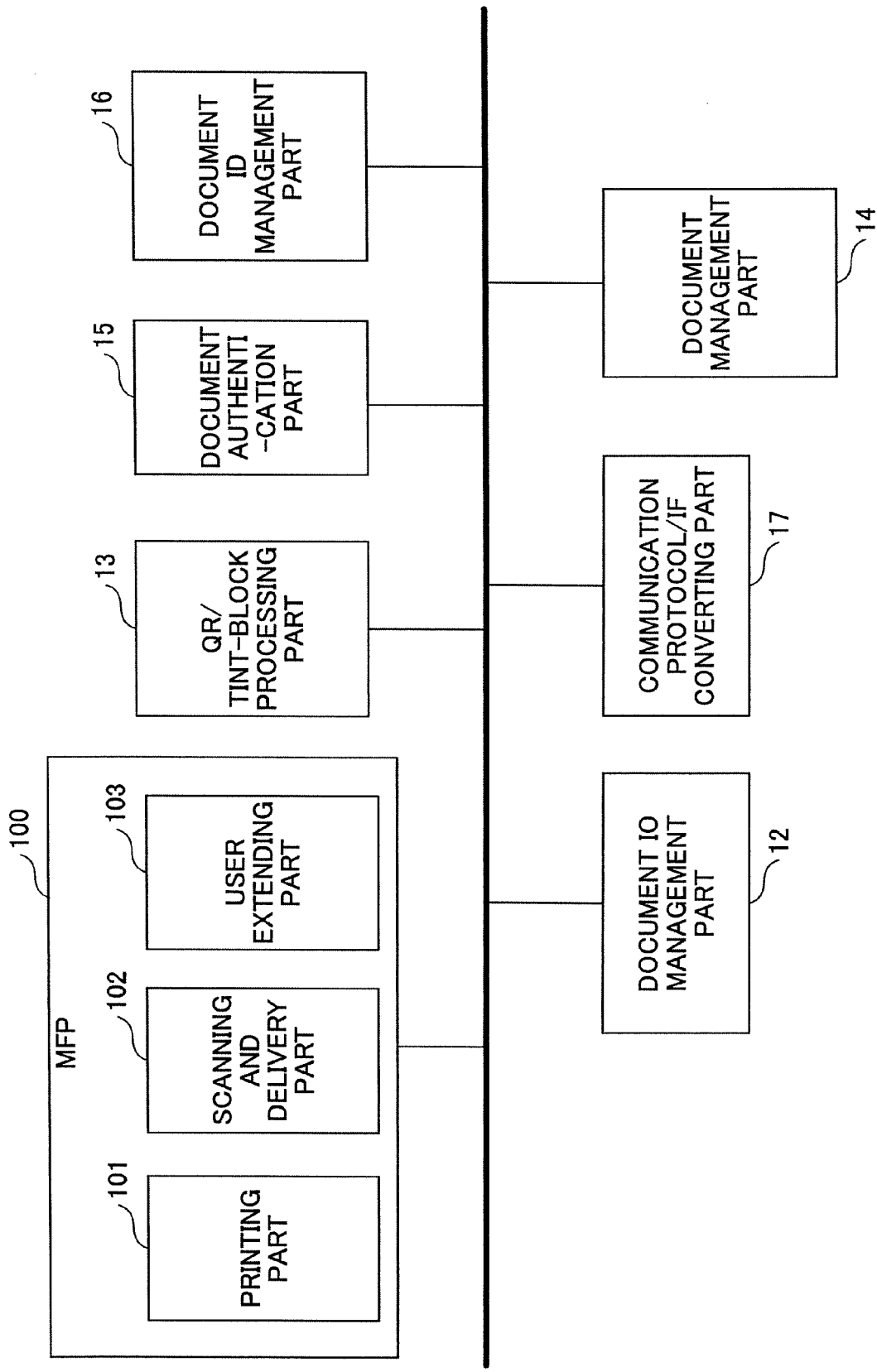
FIGS. 2 through 5 show configuration examples of a scanned document management system in one embodiment of the present invention.

FIG. 2 shows a configuration in which a scanned document management system according to an embodiment of the present invention is configured by an MFP 100 and functional parts provided in a form of Web services in a communication network.

In FIG. 2, the MFP 100 has a printing part 101 which carries out printing of a document with the use of a printing engine and a printing application, a scanning and delivery part 102 which carries out scanning and delivery of a document with the use of a scanning mechanism and a scanner application, and a user extending part 103 which realizes various functions by combining filters of software which are provided in a form of plug-in.

The MFP 100, a document IO (Input/Output) management part 12 which manages input/output of document usage in a standardized manner (including obtaining a log) and distributes processing to respective functional parts, a QR/tint-block processing part 13 which carries out processing for a QR code or a tint block to be included in a paper document, a document management part 14 such as a file server or such for managing document information (i.e., management information) and a document data body (simply referred to as document data), a document authentication part 15 issuing a document authentication representing certificate and carrying out authentication, a document ID management part 16 managing a document ID (identification), and a communication protocol/IF converting part 17 which absorbs a difference in a communication protocol or IF (interface) among the respective functional parts, are arranged in the communication network. The document IO management part 12, the QR/tint-block processing part 13, the document management part 14, the document authentication part 15, the document ID management part 16 and the communication protocol/IF converting part 17 exist separately as respective components, and are configured as Web services which are arranged in a distributed manner in the communication network. The plurality of MFPs 100 and/or the plurality of document management parts 14 may exist in the system. However, it is assumed that, for the purpose of achieving management in a standardized manner in the system, each of the document IO management part 12, the document authentication part 15 and the document ID management part 16 exists as a single functional part.

Figure 3:
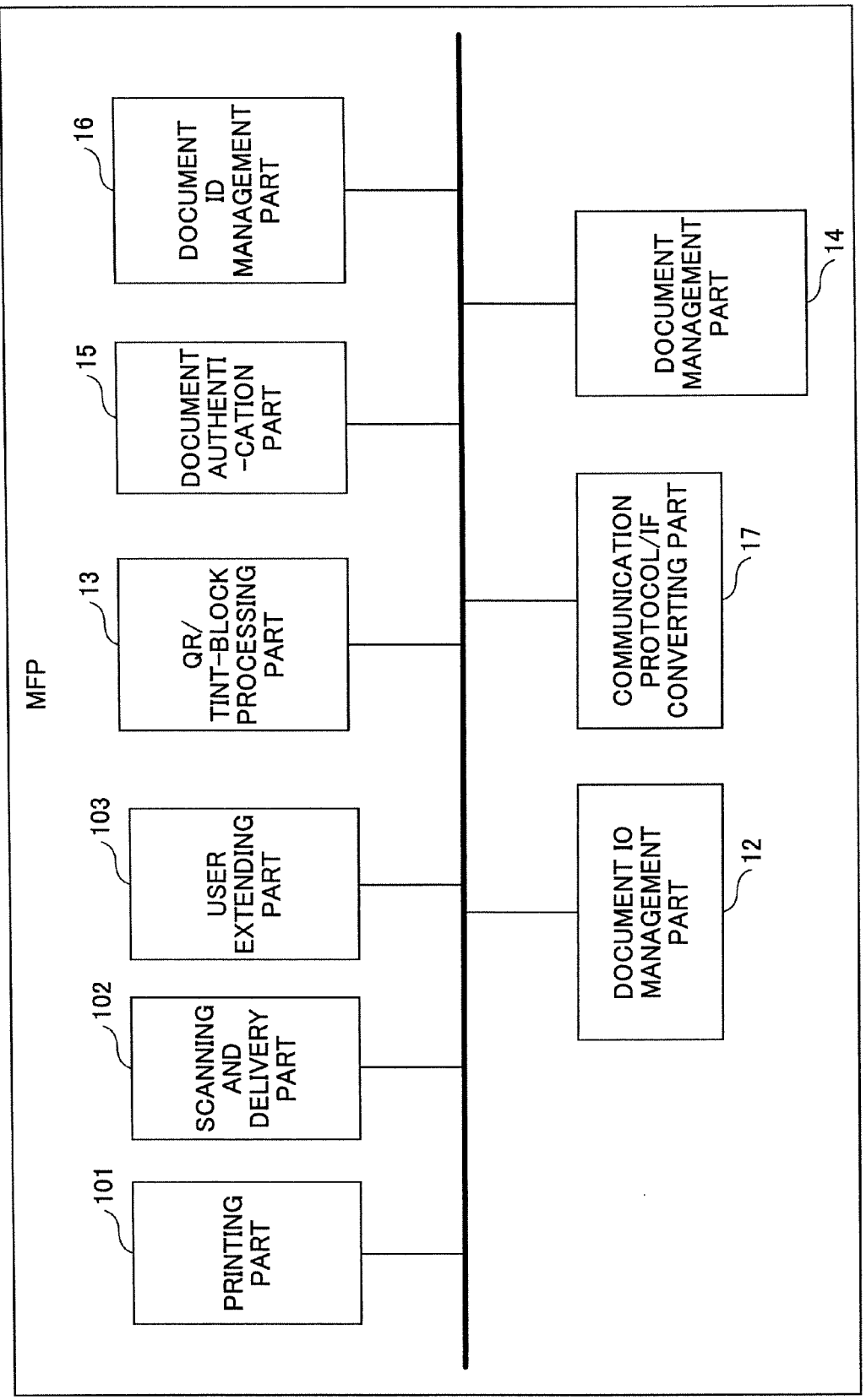

FIG. 3 shows an example in which the respective functional parts of FIG. 2 are included in the MFP 100. That is, the MFP 100 includes the printing part 101, the scanning and delivery part 102, the user extending processing part 103, the document IO management part 12, the QR/tint-block processing part 13, the document management part 14, the document authentication part 15, the document ID management part 16 and the communication protocol/IF converting part 17.

Figure 4:
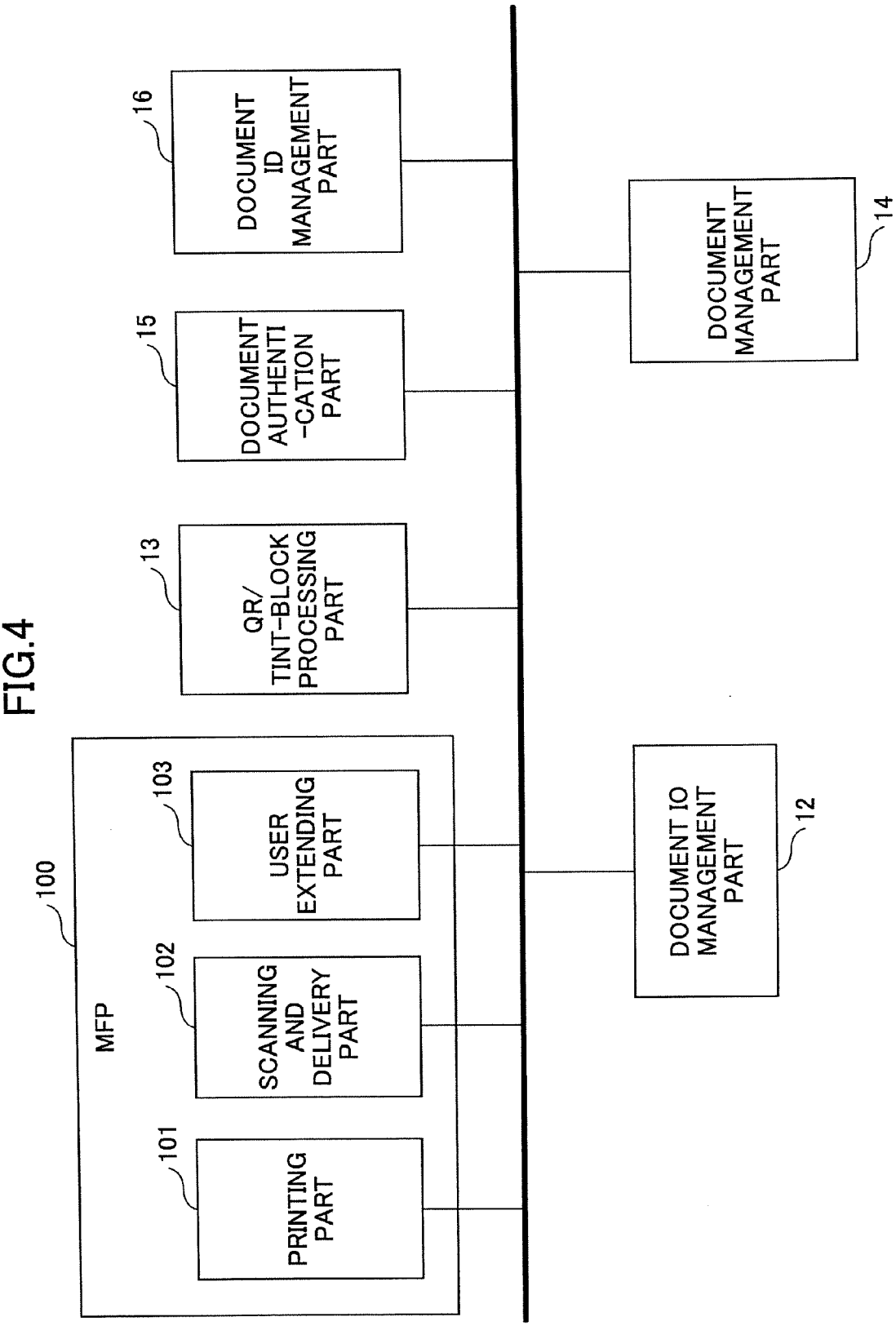

FIG. 4 shows an example in which the scanned document management system is configured by the MFP 100 and the functional parts in a form of Web services in the communication network. In this example, communication among the respective functional parts (services) is virtualized by means of an ESB (Enterprise Service Bus) or such. Thus, the system design can be made free from bondage of a communication protocol, a service interface, routing, and so forth. Accordingly, the communication protocol/IF converting part 17 shown in FIG. 2 is made not required.

Figure 5:
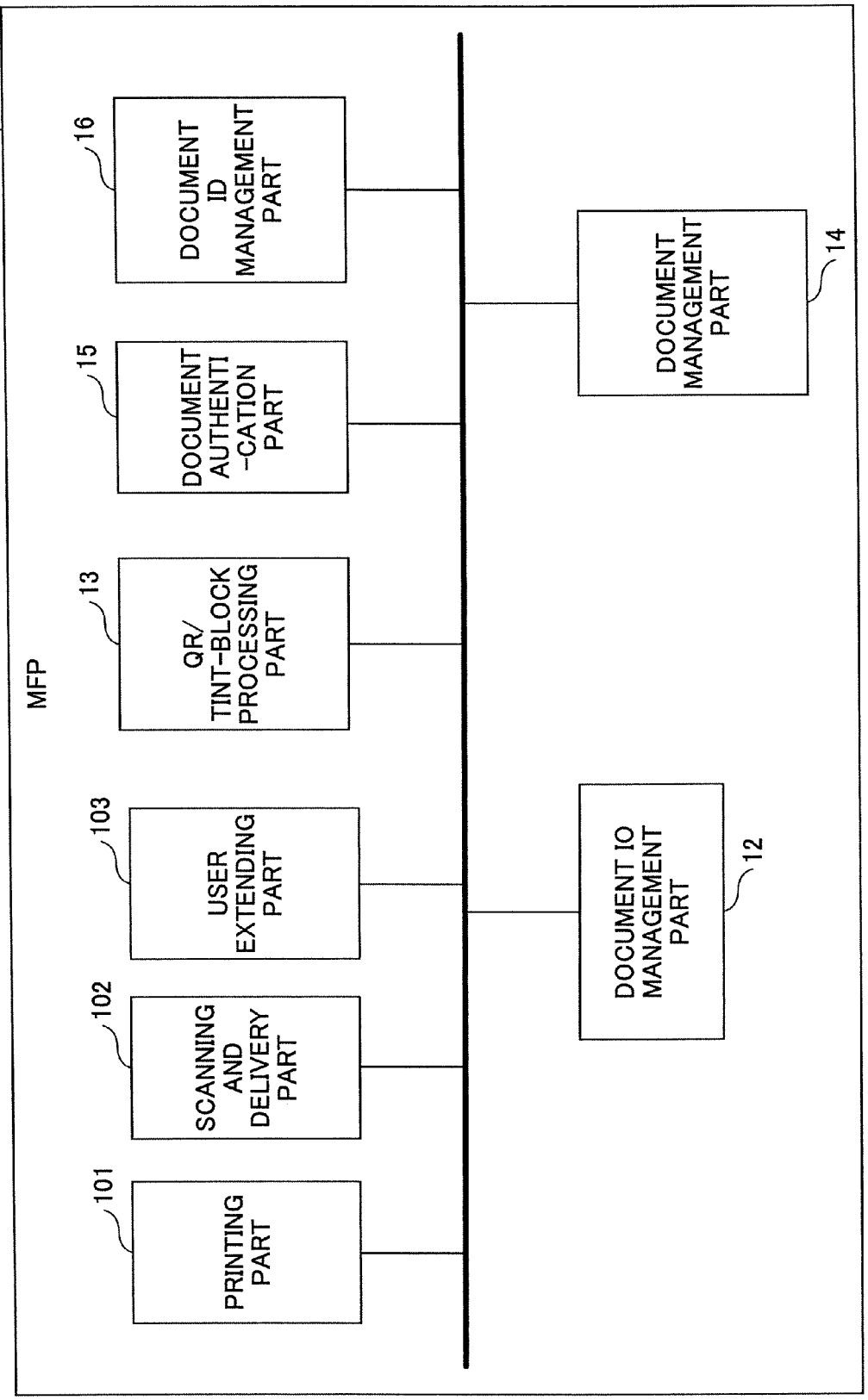

FIG. 5 shows an example in which the respective functional parts of FIG. 5 are included in the MFP 100. Thus, the MFP 100 includes the printing part 101, the scanning and delivery part 102, the user extending processing part 103, the document IO management part 12, the QR/tint-block processing part 13, the document management part 14, the document authentication part 15 and the document ID management part 16.

Figure 6:
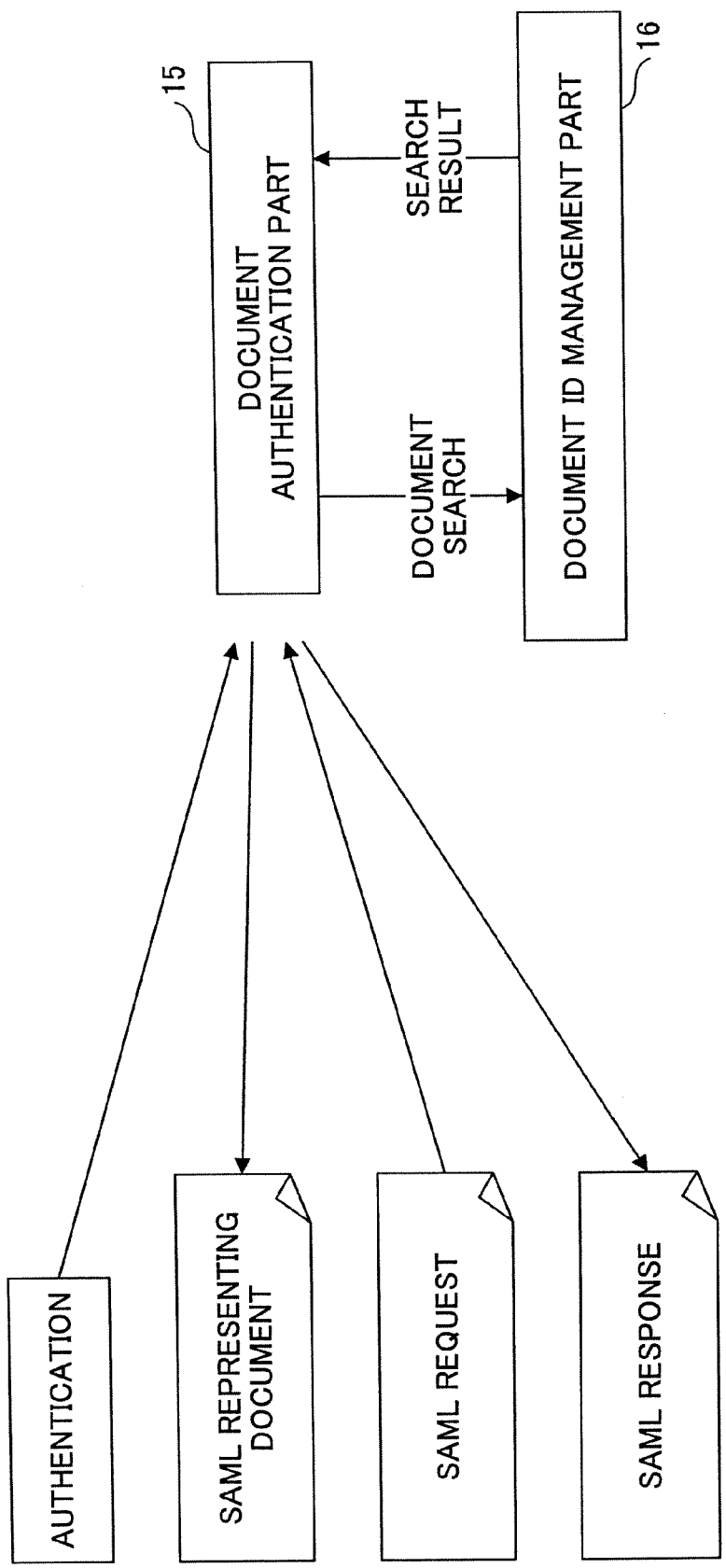
FIG. 6 shows a function outline of a document authentication part and a document ID management part.

FIG. 6 shows a general outline of functions of the document authentication part 15 and the document ID management part 16. When a document is printed out, the document authentication part 15 obtains corresponding document information from the document ID management part 16 by means of document search therefrom based on corresponding identification information (document ID) of the document in response to receiving a request for authentication (issuance of a SAML representing document) from another functional part. Then, the document authentication part 15 issues the SAML representing document including the document information. Further, when a document is scanned, the document authentication part 15 generates a SAML response indicating a result of authentication, by carrying out document search from the document ID management part 16, in response to receiving a SAML request for authenticating the SAML representing document.

Figure 7:
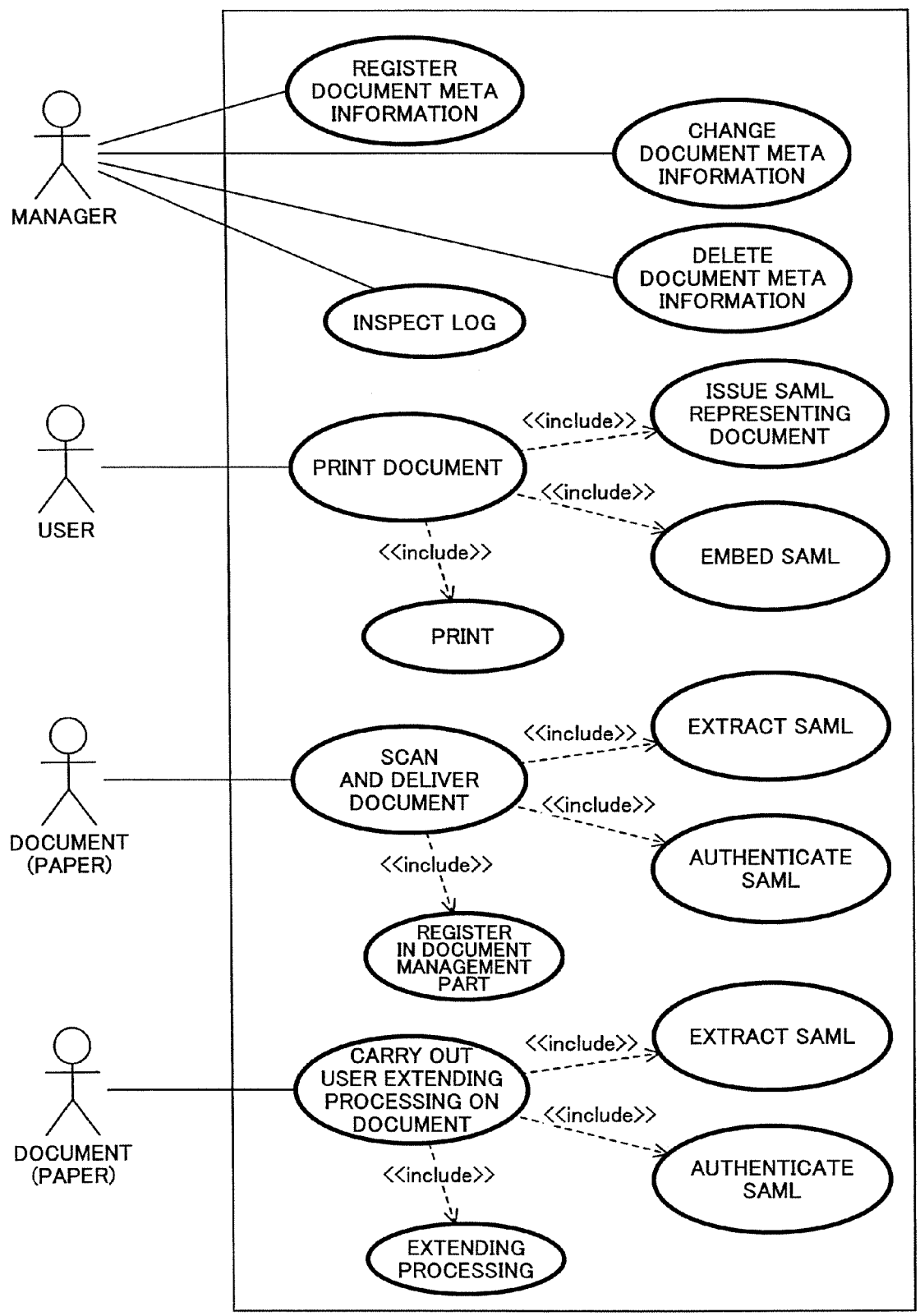
FIG. 7 shows a sequence diagram of the scanned document management system.

FIG. 7 shows a sequence diagram of the scanned document management system. Registration of document meta information, change of the document meta information, deletion of the document meta information, log inspection, made by a manger; printing of a document (including operation of issuance of the SAML representing document, embedding and printing of SAML), scanning of a document (including operation of extraction of SAML, SAML authentication, and delivery) and user extending processing of a document (including extraction of SAML, SAML authentication, and extending processing), made by a user, exist in the sequence.

Figure 8:
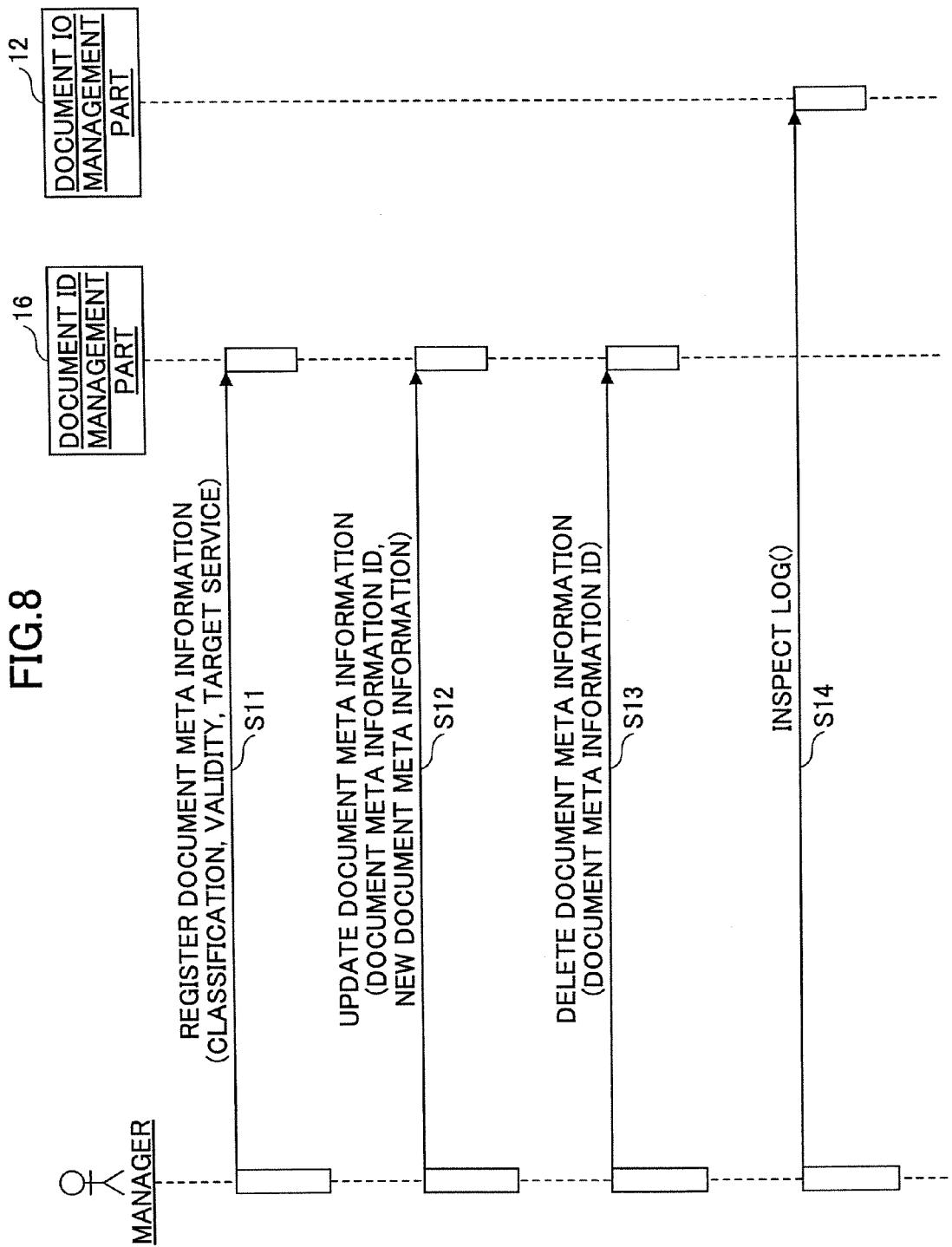
FIG. 8 shows a sequence diagram of an example of processing by a manager.
Figure 9:
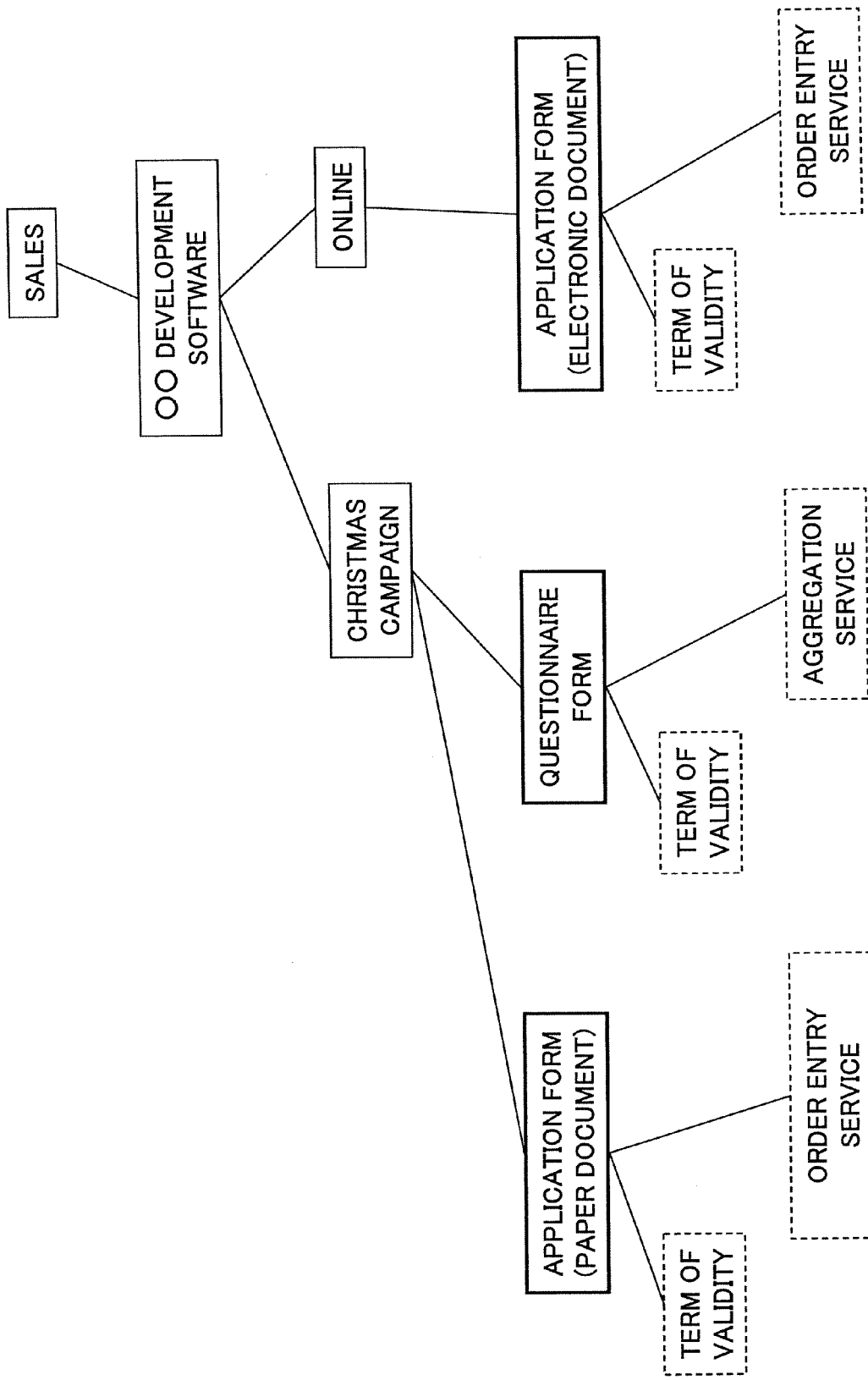
FIG. 9 shows an example of document attribute meta information (i.e., document meta information) registered in the document ID management part.

FIG. 8 shows a sequence diagram showing an example of processing made by the manager. The manager registers, for each target document, the document meta information, in the document ID management part 16 by inputting a classification (i.e., a category), the term of validity and a target service (Step S11). FIG. 9 shows an example of meta information for document attributes (i.e., the document meta information) registered in the document ID management part 16. FIG. 9 shows a state in which, for target documents, i.e., 'application form (paper document)', 'questionnaire form' and 'application form (electronic document)', the application form (paper document) and the questionnaire form are categorized (classified) in 'Christmas campaign, and the application form (electronic document) is categorized in 'online', the Christmas campaign and the online are categorized in '○○ development software', and the ○○ development software is categorized in 'sales'. Further, for the target documents, i.e., application form (paper document)', 'questionnaire form' and 'application form (electronic document)', the terms of validity and target services, i.e., 'order entry service', 'aggregation service' and 'order entry service', are designated, respectively. These may confirm to SPML (Service Provisioning Markup Language) specified by OASIS (Organization for the Advancement of Structured Information Standards).

Returning to FIG. 8, the manager may update the document meta data by inputting, to the document ID management part 16, a document meta information ID and a new document meta information (Step S12). Further, the manager may delete the document meta information by inputting, to the document ID management part 16, the document meta information ID (Step S13).

Further, the manager may inspect a log which indicates a usage history for each target document, from the document IO management part 12 (Step S14). FIG. 10 shows an example of the log indicating the usage history, which includes information such as a corresponding document ID, processed date/time, a processing service, a processing method, a requesting user and so forth, for each target document.

Figure 11:
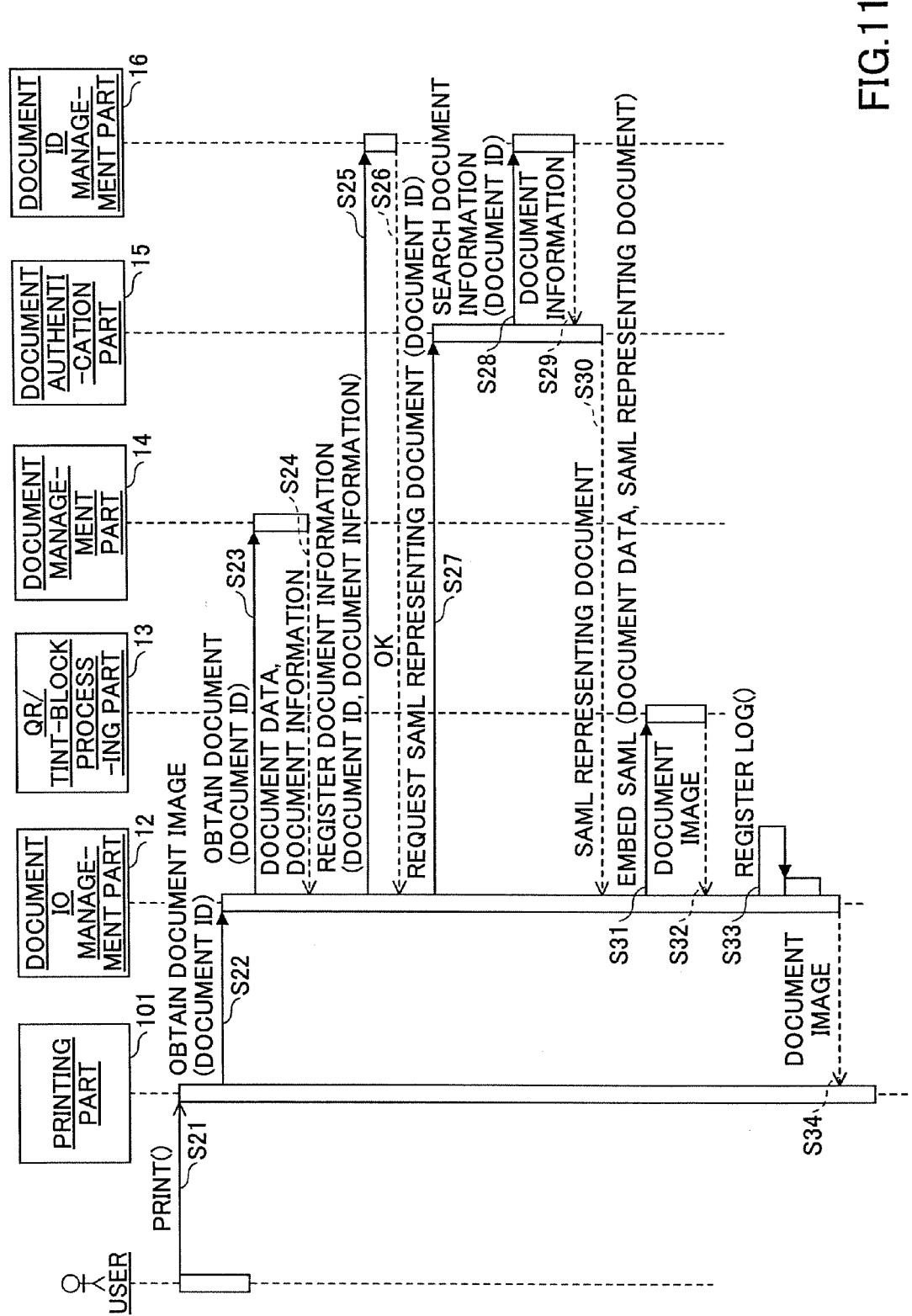
FIGS. 11 through 14 show sequence diagrams showing processing examples of printing a document.

FIG. 11 shows a sequence diagram of an example of processing of printing a document. In FIG. 11, when a user requests the printing part 101 for printing a document (Step S21), the printing part 101 requests the document IO management part 12 for obtaining a corresponding document image with a corresponding document ID (Step S22).

Next, the document IO management part 12 requests the document management part 14 for obtaining the document with the document ID (Step S23). The document management part 14 provides corresponding document data and document information to the document 10 management part 12 (Step S24).

Next, the document IO management part 12 requests the document ID management part 16 for registration of the document information with respect to the document ID with the use of the document ID and the document information (Step S25). The document ID management part 16 registers the document information with correspondence to the corresponding document meta information which is previously registered by the manager as mentioned above with reference to FIG. 9. Then, when the registration has been made properly, this fact is returned (Step S26).

Next, the document IO management part 12 requests the document authentication part 15 for issuing a SAML representing document with the use of the document ID (Step S27). The document authentication part 15 searches the document ID management part 16 for the document information with the use of the document ID, and thus, obtains the document information (Steps S28, S29). The document authentication part 15 issues the SAML representing document including the thus-obtained document information, and transmits the same to the document IO management part 12 (Step S30).

Next, the document IO management part 12 requests the QR/tint-block processing part 13 for embedding SAML with the use of the document data and the SAML representing document (Step S31). The QR/tint-block processing part 13 generates the corresponding document image in which the SAML representing document is embedded, and transmits the same to the document IO management part 12 (Step S32).

Next, the document IO management part 12 registers a corresponding usage history in the log (Step S33), and transmits the document image in which the SAML representing document is embedded to the printing part 101 (Step S34). The printing part 101 prints out the document image.

Figure 12:
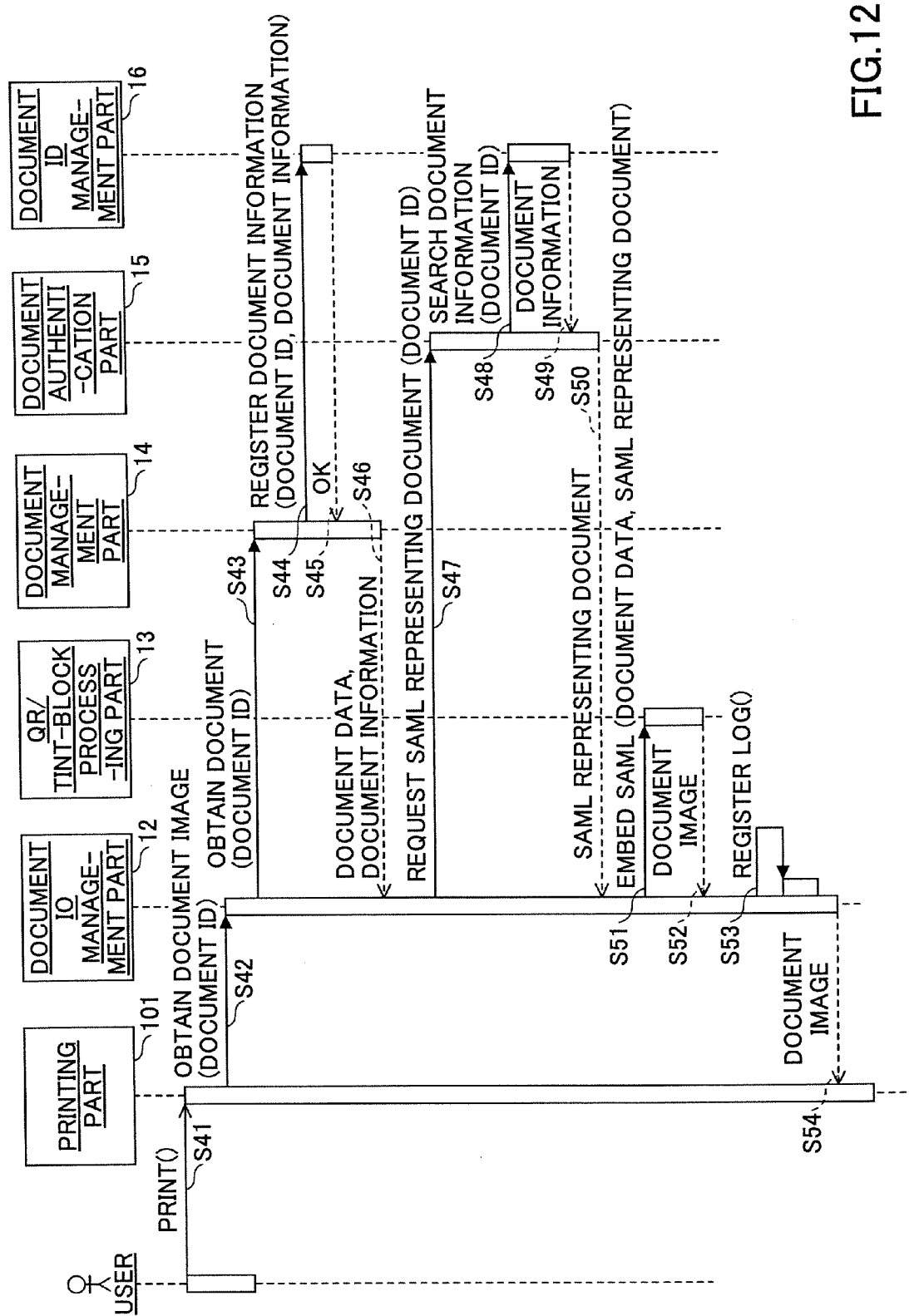

FIG. 12 shows a sequence diagram of another example of processing of printing a document. In this example, when the document IO management part 12 obtains a document from the document management part 14, the document information is registered in the document ID management part 16 from the document management part 14.

In FIG. 12, when a user requests the printing part 101 for printing a document (Step S41), the printing part 101 requests the document IO management part 12 for obtaining a corresponding document image with the use of a corresponding document ID (Step S42).

Next, the document IO management part 12 requests the document management part 14 for obtaining the document with the use of the document ID (Step S43). The document management part 14 requests the document ID management part 16 for registration of corresponding document information with respect to the document ID with the use of the document ID and the document information (Step S44). The document ID management part 16 registers the document information with correspondence to the corresponding document meta information which is previously registered by the manager as mentioned above with reference to FIG. 9. Then, when the registration has been made properly, this fact is returned (Step S45). The document management part 14 provides the document data and the document information to the document IO management part 12 (Step S46).

Next, the document IO management part 12 requests the document authentication part 15 for issuing a SAML representing document with the use of the document ID (Step S47). The document authentication part 15 searches the document ID management part 16 for the document information with the use of the document ID, obtains the document information (Steps S48, S49). The document authentication part 15 issues the SAML representing document including the thus-obtained document information, and transmits the same to the document IO management part 12 (Step S50).

Next, the document IO management part 12 requests the QR/tint-block processing part 13 for embedding SAML with the use of the document data and the SAML representing document (Step S51). The QR/tint-block processing part 13 generates the corresponding document image in which the SAML representing document is embedded, and transmits the same to the document IO management part 12 (Step S52).

Next, the document IO management part 12 registers a corresponding usage history in the log (Step S53), and transmits the document image in which the SAML representing document is embedded to the printing part 101 (Step S54). The printing part 101 prints out the document image.

Figure 13:
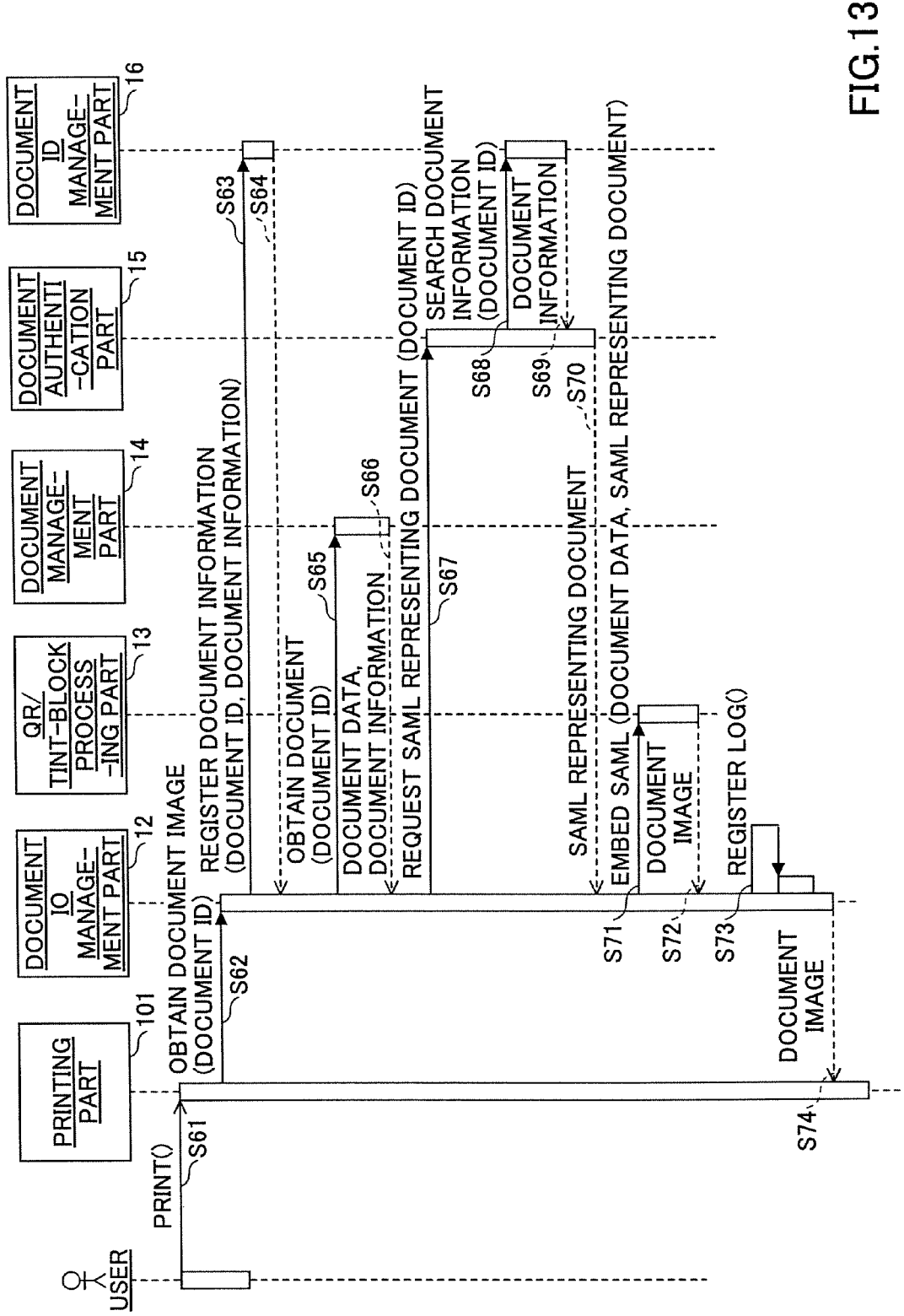

FIG. 13 shows a sequence diagram of another example of processing of printing a document. In this example, before the document IO management part 12 obtains the document from the document management part 14, the document information is registered in the document ID management part 16 from the document IO management part 12.

In this example, when a user requests the printing part 101 for printing a document (Step S61), the printing part 101 requests the document IO management part 12 for obtaining a corresponding document image with a corresponding document ID (Step S62).

Next, the document IO management part 12 requests the document ID management part 16 for registration of the corresponding document information with respect to the document ID with the use of the document ID and the document information (Step S63). The document ID management part 16 registers the document information with correspondence to the corresponding document meta information which is previously registered by the manager as mentioned above with reference to FIG. 9. Then, when the registration has been made properly, this fact is returned (Step S64).

Next, the document IO management part 12 requests the document management part 14 for obtaining the document with the use of the document ID (Step S65). The document management part 14 provides corresponding document data and document information to the document IO management part 12 (Step S66).

Next, the document IO management part 12 requests the document authentication part 15 for issuing a SAML representing document with the use of the document ID (Step S67). The document authentication part 15 searches the document ID management part 16 for the document information with the use of the document ID, and thus, obtains the document information (Steps S68, S69). The document authentication part 15 issues a SAML representing document including the thus-obtained document information, and transmits the same to the document IO management part 12 (Step S60).

Next, the document IO management part 12 requests the QR/tint-block processing part 13 for embedding SAML with the use of the document data and the SAML representing document (Step S71). The QR/tint-block processing part 13 generates the corresponding document image in which the SAML representing document is embedded, and transmits the same to the document IO management part 12 (Step S72).

Next, the document IO management part 12 registers a corresponding usage history in the log (Step S73), and transmits the document image in which the SAML representing document is embedded to the printing part 101 (Step S74). The printing part 101 prints out the document image.

Figure 14:
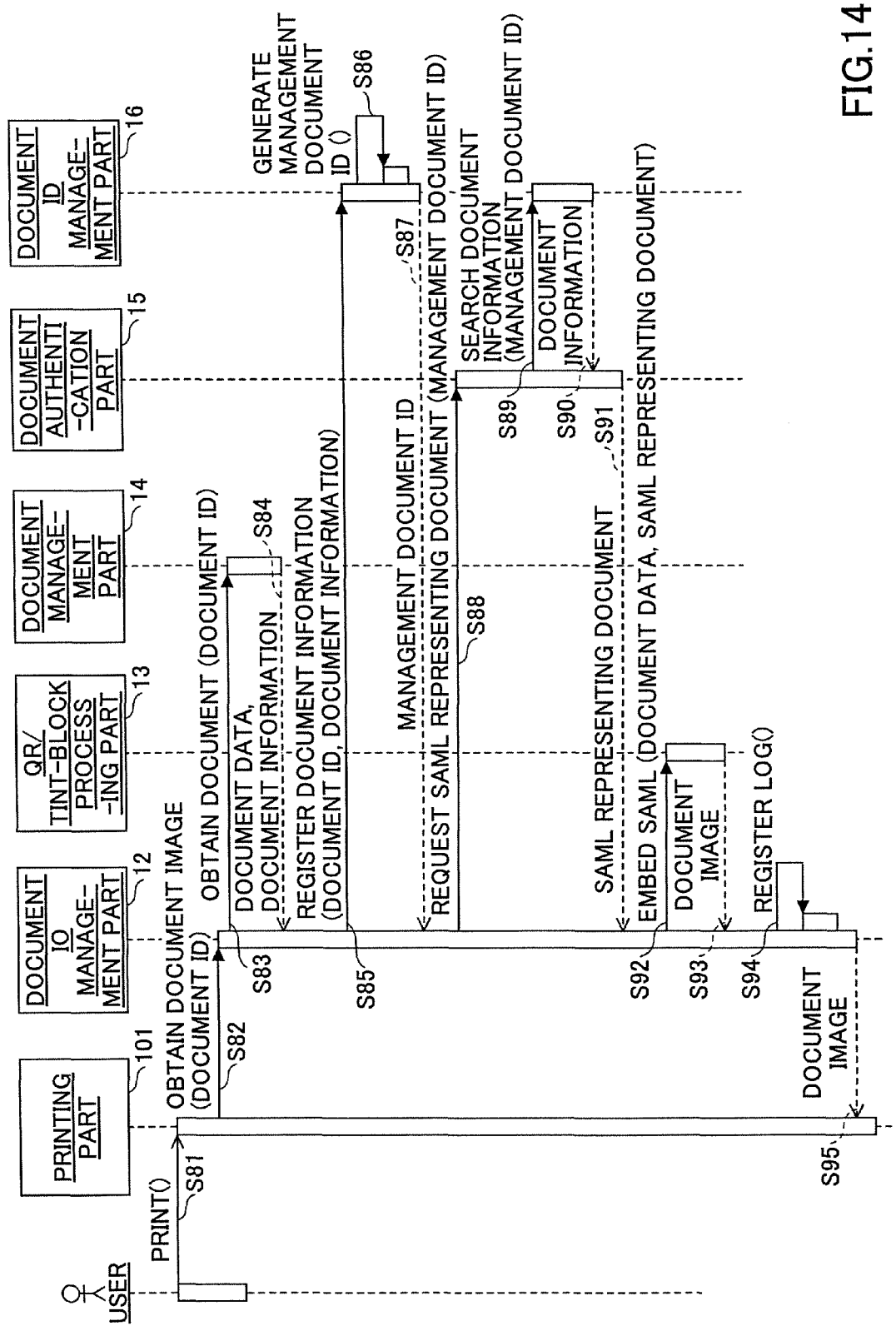

FIG. 14 shows a sequence diagram of another example of processing of printing a document. In this example, instead of the document ID, a new management document ID is generated by the document ID management part 16. For a case where there are the plurality of document management parts 14, the different document IDs may be provided accordingly. However, as a result of the new management document ID being thus generated by the document ID management part 16, a form of the ID is standardized, and thus, the management is made easier.

In this example, when a user requests the printing part 101 for printing a document (Step S81), the printing part 101 requests the document IO management part 12 for obtaining a corresponding document image with the use of a corresponding document ID (Step S82).

Next, the document IO management part 12 requests the document management part 14 for obtaining the document with the document ID (Step S83). The document management part 14 provides corresponding document data and document information to the document IO management part 12 (Step S84).

Next, the document IO management part 12 requests the document ID management part 16 for registration of the document information with respect to the document ID with the use of the document data and the document information (Step S85). The document ID management part 16 generates a new document management ID (Step S86), registers the document information with correspondence to the corresponding document meta information which is previously registered by the manager as mentioned above with reference to FIG. 9. Then, when the registration has been made properly, the document management ID is returned (Step S87).

Next, the document IO management part 12 requests the document authentication part 15 for issuing a SAML representing document with the use of the document management ID (Step S88). The document authentication part 15 searches the document ID management part 16 for the document information with the use of the document management ID, and thus, obtains the document information (Steps S89, S90). The document authentication part 15 issues a SAML representing document including the thus-obtained document information, and transmits the same to the document IO management part 12 (Step S91).

Next, the document IO management part 12 requests the QR/tint-block processing part 13 for embedding SAML with the use of the document data and the SAML representing document (Step S92). The QR/tint-block processing part 13 generates the corresponding document image in which the SAML representing document is embedded, and transmits the same to the document IO management part 12 (Step S93).

Next, the document IO management part 12 registers a corresponding usage history in the log (Step S94), and transmits the document image in which the SAML representing document is embedded to the printing part 101 (Step S95). The printing part 101 prints out the document image.

Figure 15:
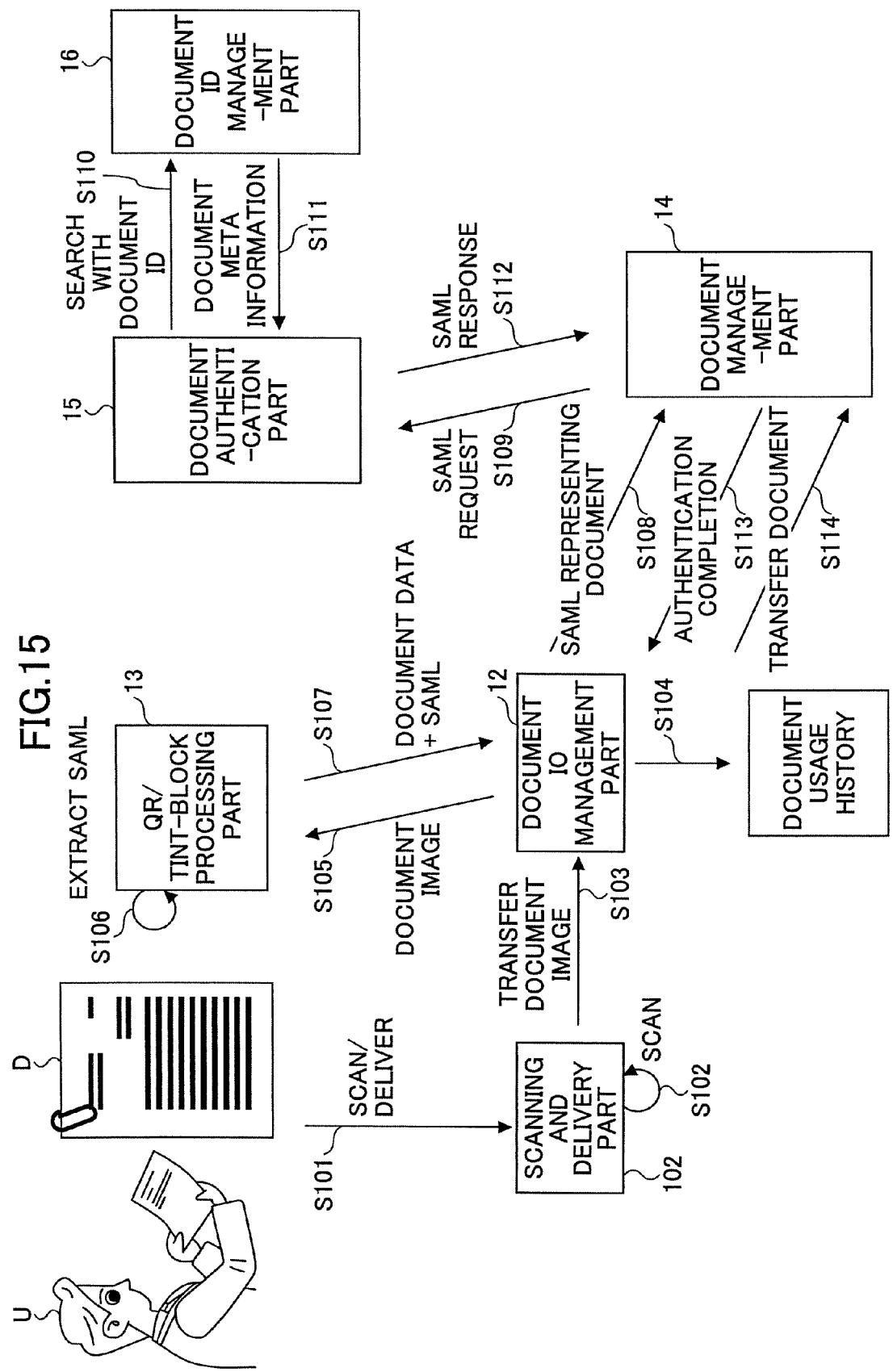
FIG. 15 shows an operation flow of scanning a document.

FIG. 15 shows a flow of operation for scanning a document. In FIG. 15, when a user requests the scanning and delivery part 102 for scanning and delivery of a paper document D in which SAML is embedded in a QR code or a tint block (Step S101), the scanning and delivery part 102 scans the paper document D (Step S102), and transfers a corresponding document image to the document IO management part 12 (Step S103).

Next, the document IO management part 12 registers a corresponding document usage history in a log (Step S104), and transmits the document image to the QR/tint-block processing part 13 (Step S105).

Next, the QR/tint-block processing part 13 extracts the SAML from the document image (Step S106), and transmits the document data and the SAML information to the document IO management part 12 (Step S107).

Next, the document IO management part 12 transmits a corresponding SAML representing document to the document management part 14 (Step S108), and the document management part 14 transmits a SAML request requesting the document authentication part 15 to authenticate the SAML representing document (Step S109).

Next, the document authentication part 15 searches the document ID management part 16 with the use of the document ID to obtain the document meta information (Steps S110, S11). When the authentication has been thus made properly with the use of the thus-obtained document meta information, a SAML response indicating this fact is returned to the document management part 14 (Step S112).

Next, the document management part 14 notifies the document IO management part 12 of this authentication completion (Step S113), and then, the document IO management part 12 transfers the document image thus scanned to the document management part 14 (Step S114).

Figure 16:
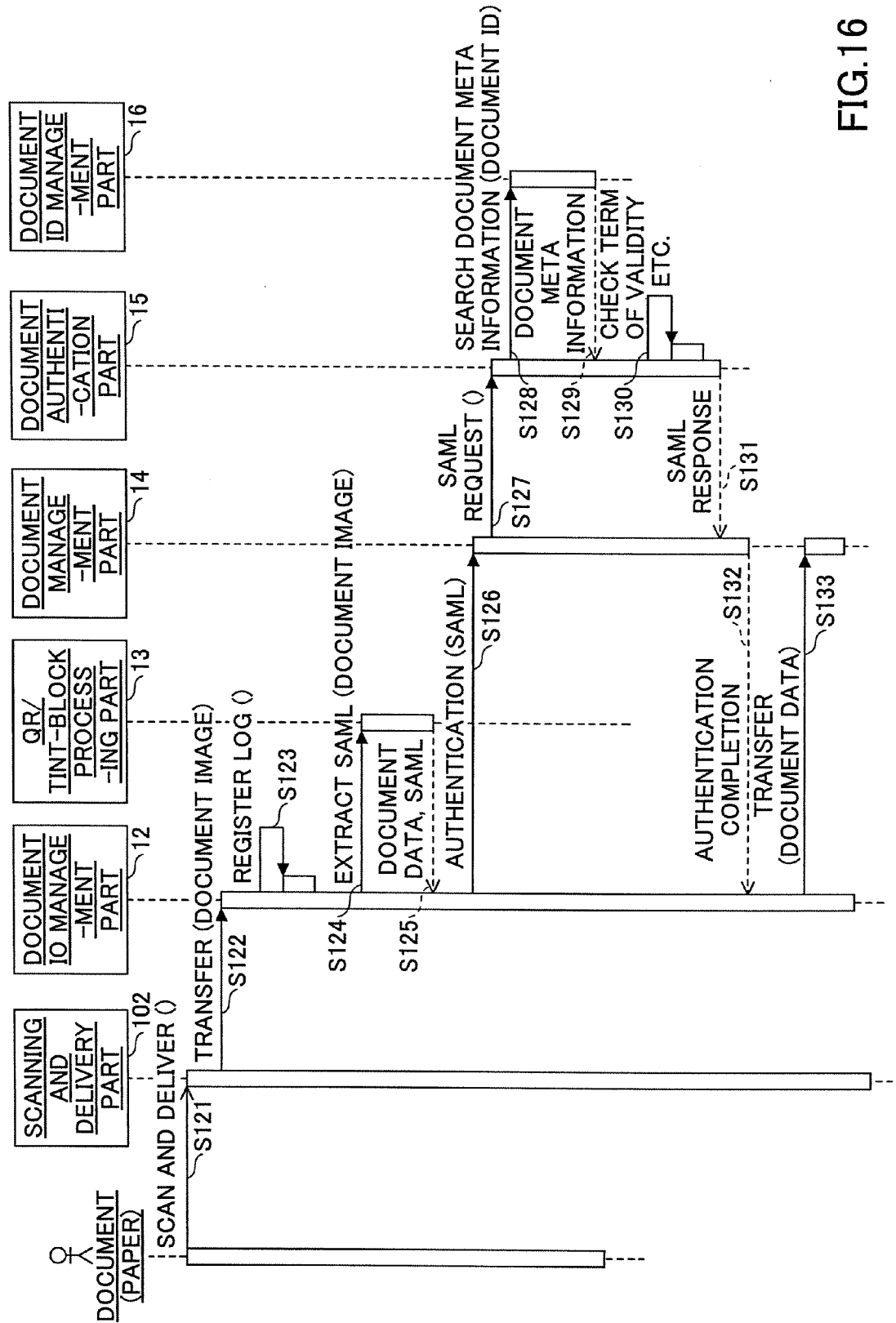
FIGS. 16 and 17 show sequence diagrams showing processing examples of scanning a document.

FIG. 16 shows a sequence diagram of the processing for scanning a document. In FIG. 16, when the user requests the scanning and delivery part 102 for scanning and delivery of the paper document in which SAML is embedded in the QR code or the tint block (Step S121), the scanning and delivery part 102 scans the paper document and transfers the corresponding document image to the document IO management part 12 (Step S122).

Next, the document IO management part 12 registers the corresponding document usage history in the log (Step S123), and requests the QR/tint-block processing part 13 for extracting SAML from the document image (Step S124). The QR/tint-block processing part 13 extracts the SAML from the document image and transmits the document data and the SAML information to the document IO management part 12 (Step S125).

Next, the document IO management part 12 requests the document management part 14 for authentication with the use of the SAML representing document (Step S126), and the document management part 14 transmits a SAML request requesting the document authentication part 15 to authenticate the SAML representing document (Step S127).

The document authentication part 15 searches the document ID management part 16 with the use of the document ID to obtain the document meta information (Steps S128, S129). Then, the document authentication part 15 carries out checking operation, based on the thus-obtained document meta information, to check as to whether or not the current date/time is within the term of validity of the document, as well as whether or not the classification (category) and the target service of the document are those for which transfer is allowed (Step S130). When the authentication has been thus made properly, a SAML response indicating this fact is transmitted to the document management part 14 (Step S131).

The document management part 14 notifies the document IO management part 12 of this authentication completion (Step S132), and then, the document IO management part 12 transfers the document image thus scanned to the document management part 14 (Step S133).

Figure 17:
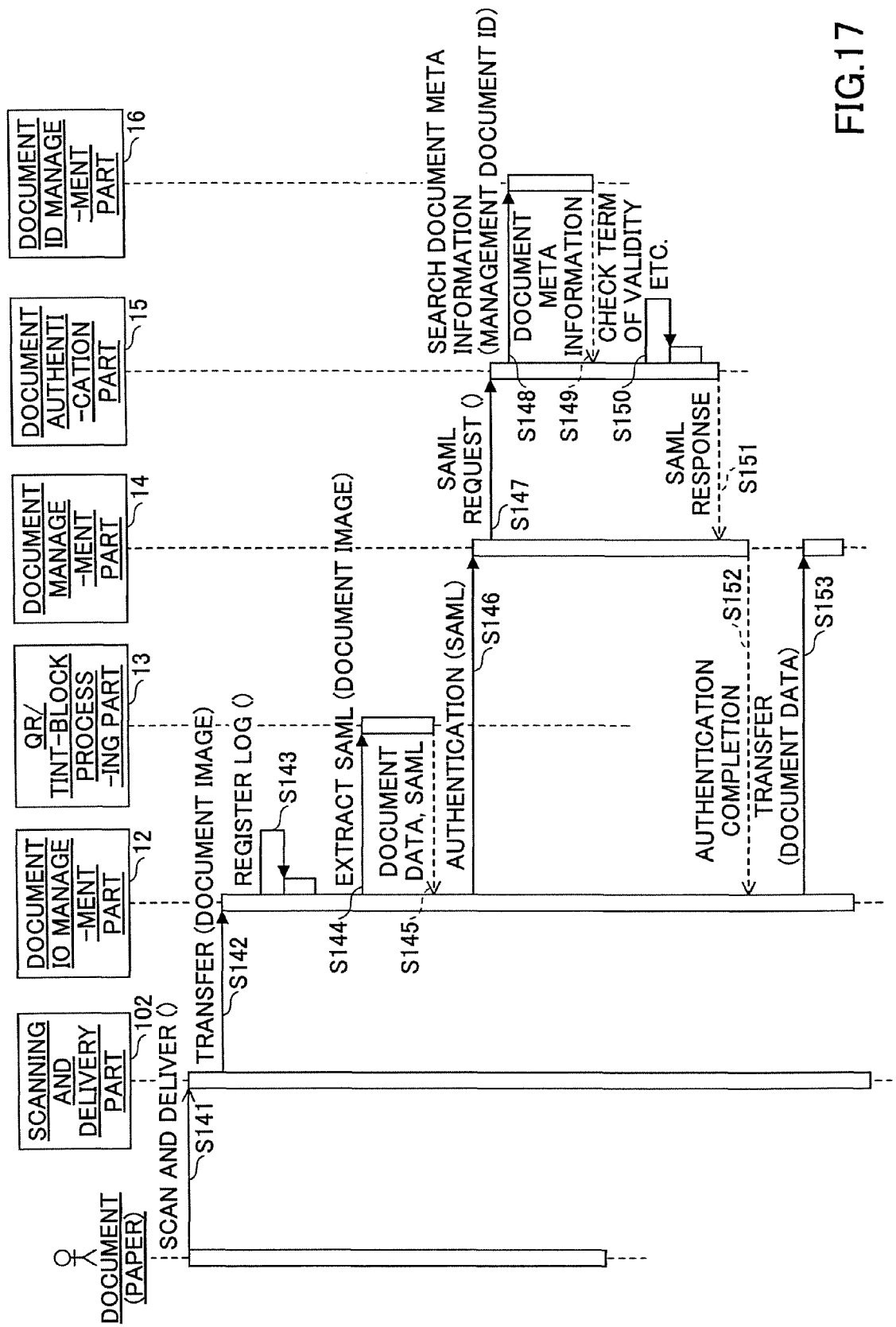

FIG. 17 shows a sequence diagram of another example of processing for scanning a document. In this example, the above-mentioned document management ID is used for the search from the document ID management part 16.

In FIG. 17, when a user requests the scanning and delivery part 102 for scanning and delivery of a paper document in which SAML is embedded in a QR code or a tint block (Step S141), the scanning and delivery part 102 scans the paper document and transfers a corresponding document image to the document IO management part 12 (Step S142).

Next, the document IO management part 12 registers a corresponding document usage history in a log (Step S143), and requests the QR/tint-block processing part 13 for extracting SAML with the use of the document image (Step S144). The QR/tint-block processing part 13 extracts the SAML from the document image and transmits the document data and the SAML information to the document IO management part 12 (Step S145).

Next, the document IO management part 12 requests the document management part 14 for authentication with the use of the SAML representing document (Step S146), and the document management part 14 transmits a SAML request requesting the document authentication part 15 to authenticate the SAML representing document (Step S147).

The document authentication part 15 searches the document ID management part 16 with the use of the management document ID to obtain the document meta information (Steps S148, S149). Then, the document authentication part 15 carries out checking operation, based on the thus-obtained document meta information, to check as to whether or not the current date/time is within the term of validity of the document as well as whether or not the classification (category) and the target service of the document are those for which transfer is allowed (Step S150). When the authentication has been thus made properly, a SAML response indicating this fact is transmitted to the document management part 14 (Step S151).

The document management part 14 notifies the document IO management part 12 of this authentication completion (Step S152), and then, the document IO management part 12 transfers the document image thus scanned to the document management part 14 (Step S153).

Figure 18:
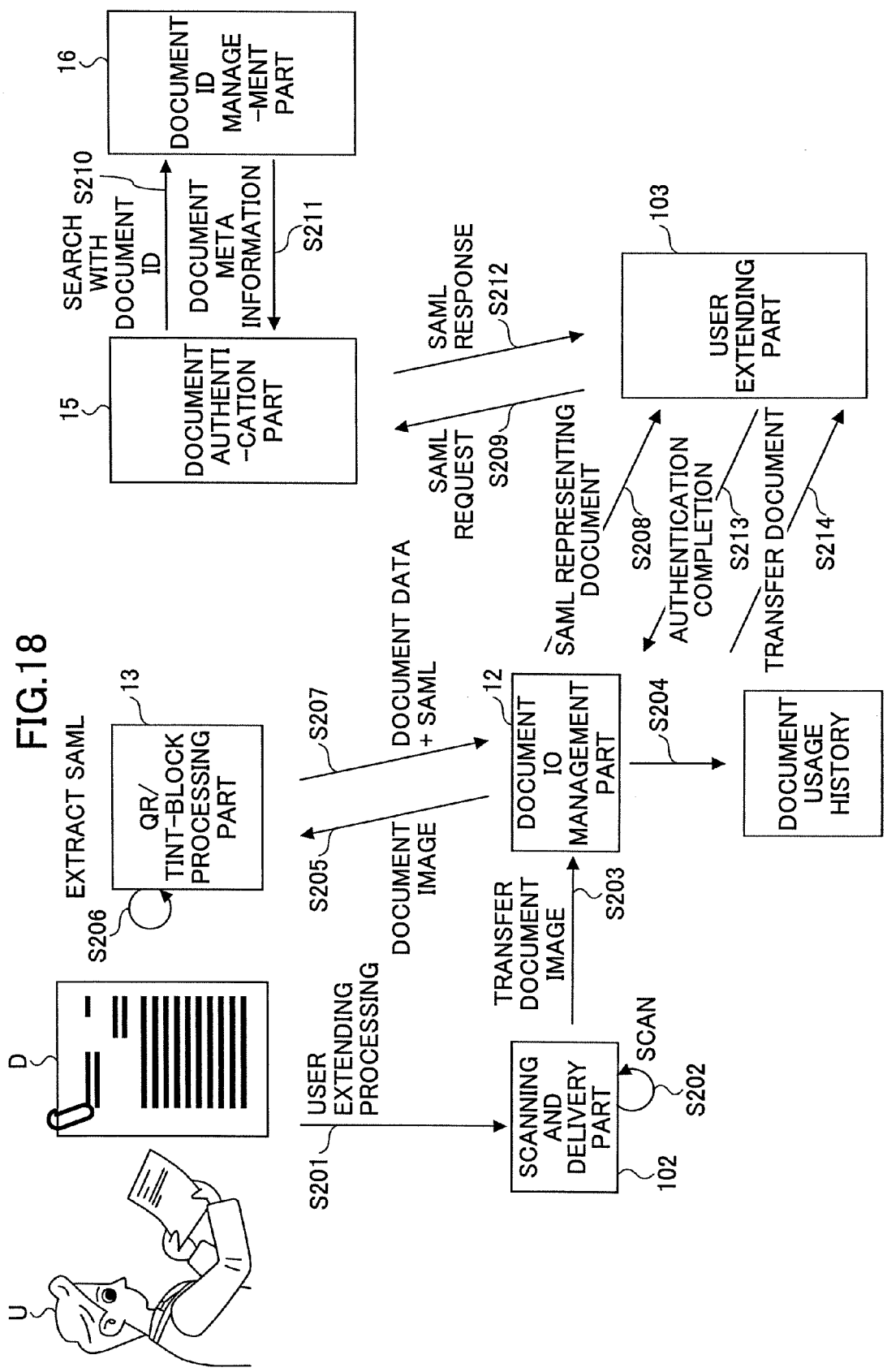
FIG. 18 shows an operation flow of scanning a document based on user extending processing.

FIG. 18 shows a flow of operation for scanning a document based on user extending processing. In FIG. 18, when a user requests the scanning and delivery part 102 for carrying out the user extending processing on a paper document D in which SAML is embedded in a QR code or a tint block (Step S201), the scanning and delivery part 102 scans the paper document D (Step S202), and transfers a corresponding document image to the document IO management part 12 (Step S203).

Next, the document IO management part 12 registers a corresponding document usage history in a log (Step S204), and transmits the document image to the QR/tint-block processing part 13 (Step S205).

Next, the QR/tint-block processing part 13 extracts the SAML from the document image (Step S206), and transmits the document data and the SAML information to the document IO management part 12 (Step S207).

Next, the document IO management part 12 transmits a corresponding SAML representing document to the user extending part 103 (Step S208), and the user extending part 103 transmits a SAML request requesting the document authentication part 15 to authenticate the SAML representing document (Step S209).

Next, the document authentication part 15 searches the document ID management part 16 with the use of the document ID to obtain the document meta information (Steps S210, S211). When the authentication has been thus made properly, a SAML response indicating this fact is returned to the user extending part 103 (Step S212).

Next, the user extending part 103 notifies the document IO management part 12 of this authentication completion (Step S213), and then, the document IO management part 12 transfers the document image thus scanned to the user extending part 103 (Step S214). Then, the user extending part 103 carries out various sorts of user extending processing, previously customized for the user, on the thus-transferred document image.

Figure 19:
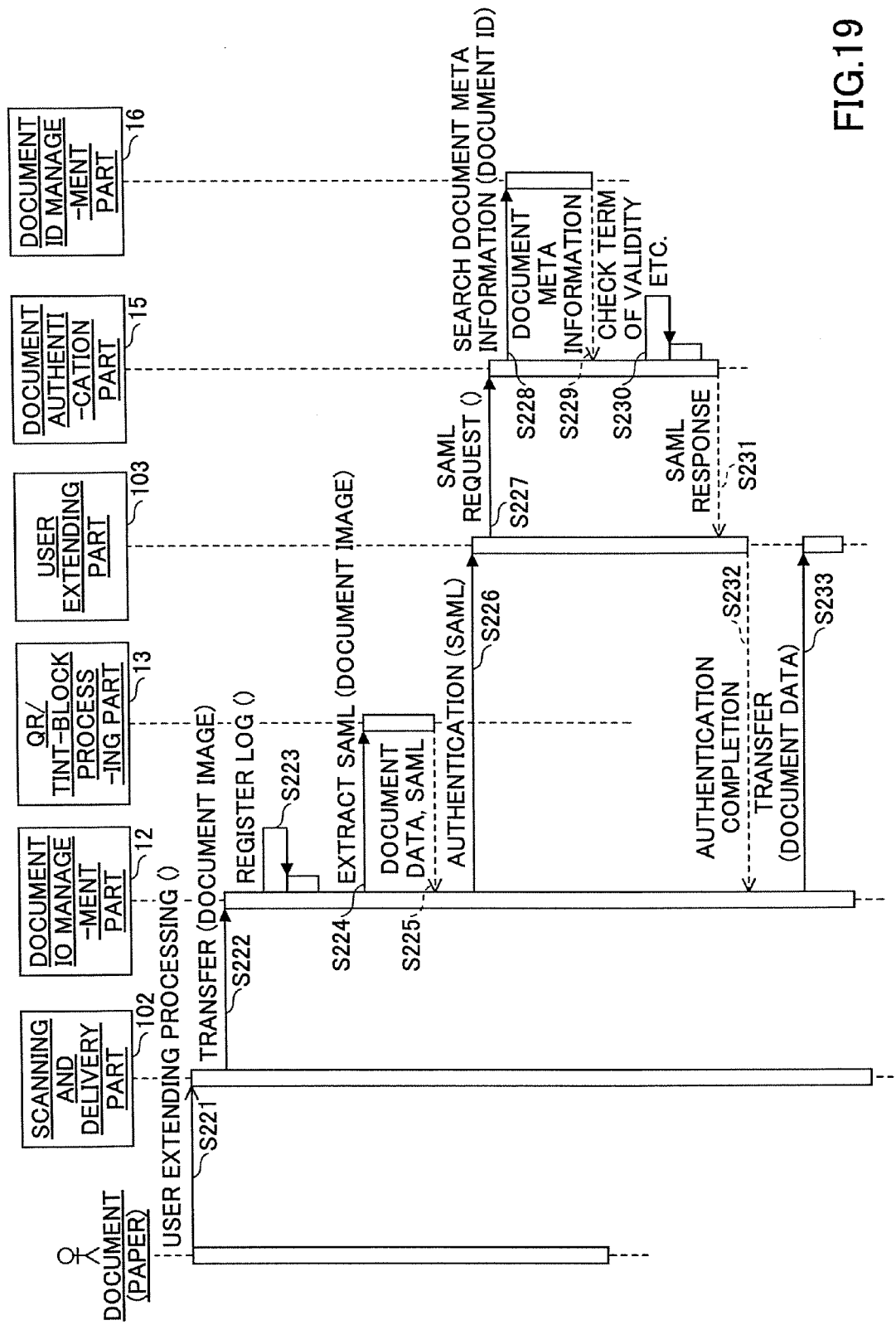
FIGS. 19 and 20 show sequence diagrams showing processing examples of scanning a document based on the user extending processing.

FIG. 19 shows a sequence diagram of the example of processing for scanning the document based on the user extending processing. In FIG. 19, when the user requests the scanning and delivery part 102 for carrying out the user extending processing of the paper document in which SAML is embedded in the QR code or the tint block (Step S221), the scanning and delivery part 102 scans the paper document and transfers the corresponding document image to the document IO management part 12 (Step S222).

Next, the document IO management part 12 registers the corresponding document usage history in the log (Step S223), requests the QR/tint-block processing part 13 for extracting SAML with the use of the document image (Step S224), and the QR/tint-block processing part 13 extracts the SAML from the document image and transmits the document data and the SAML information to the document IO management part 12 (Step S225).

Next, the document IO management part 12 requests the user extending part 103 for authentication with the use of the corresponding SAML representing document (Step S226), and the user extending part 103 transmits the SAML request requesting the document authentication part 15 to authenticate the SAML representing document (Step S227).

The document authentication part 15 searches the document ID management part 16 with the use of the document ID to obtain the document meta information (Steps S228, S229). Then, the document authentication part 15 carries out checking operation, based on the thus-obtained document meta information, to check as to whether or not the current date/time is within the term of validity of the document as well as whether or not the classification (category) and the target service of the document are those for which transfer is allowed (Step S230). When the authentication has been thus made properly, the SAML response indicating this fact is transmitted to the user extending part 103 (Step S231).

The user extending part 103 notifies the document IO management part 12 of this authentication completion (Step S232), and then, the document IO management part 12 transfers the document image thus scanned to the user extending part 103 (Step S233). Then, the user extending part 103 carries out various sorts of user extending processing, previously customized for the user, on the thus-transferred document image.

Figure 20:
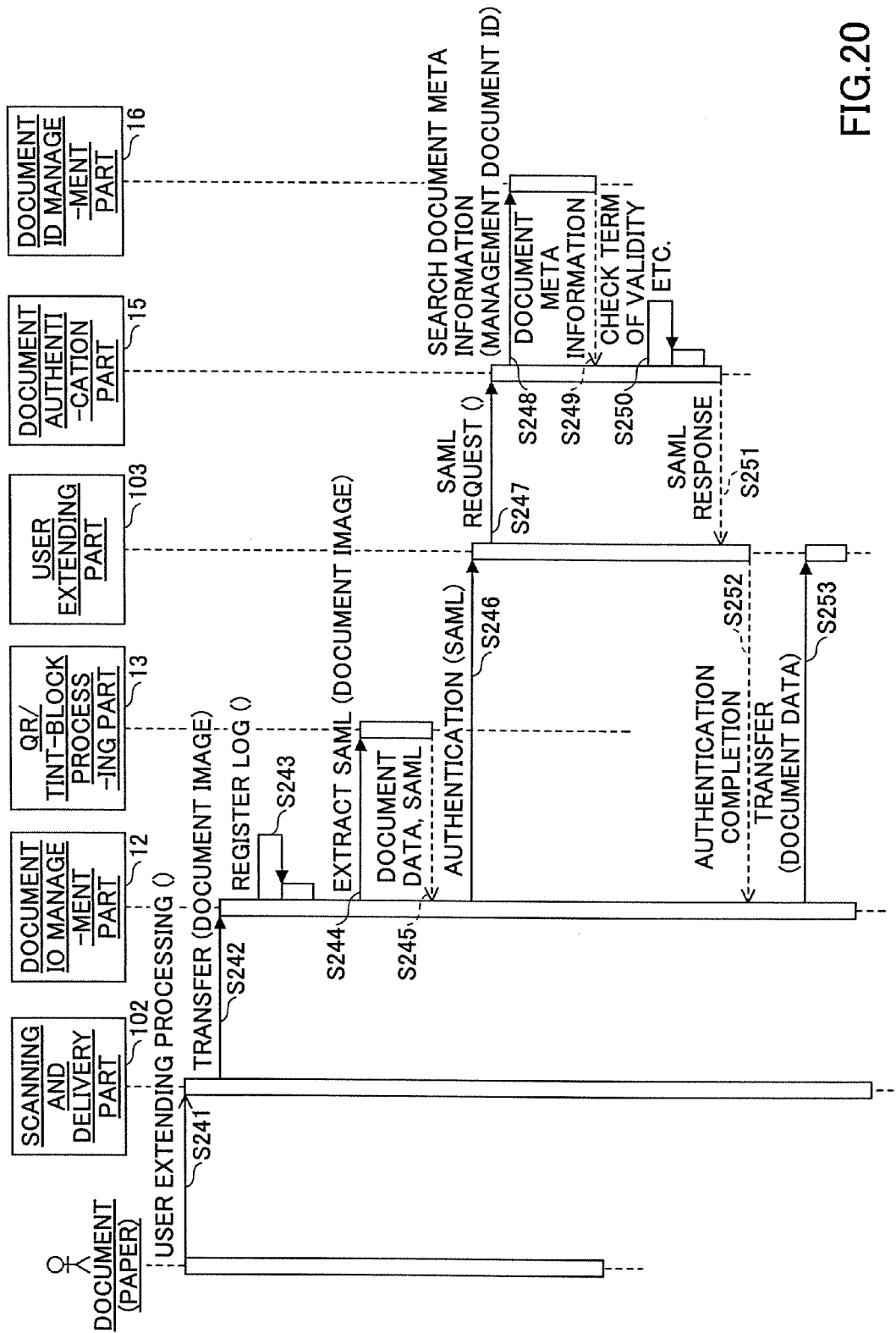

FIG. 20 shows a sequence diagram of another example of processing for scanning a document based on the user extending processing. In this example, the above-mentioned document management ID is used for the search from the document ID management part 16.

In FIG. 20, when a user requests the scanning and delivery part 102 for carrying out the user extending processing on a paper document in which SAML is embedded in a QR code or a tint block (Step S241), the scanning and delivery part 102 scans the paper document and transfers a corresponding document image to the document IO management part 12 (Step S242).

Next, the document IO management part 12 registers a corresponding document usage history in a log (Step S243), requests the QR/tint-block processing part 13 for extracting SAML with the use of the document image (Step S244), and the QR/tint-block processing part 13 extracts the SAML from the document image and transmits the document data and the SAML information to the document IO management part 12 (Step S245).

Next, the document IO management part 12 requests the user extending part 103 for authentication with the use of a corresponding SAML representing document (Step S246), and the user extending part 103 transmits a SAML request requesting the document authentication part 15 to authenticate the SAML representing document (Step S247).

The document authentication part 15 searches the document ID management part 16 with the use of the document management ID to obtain the document meta information (Steps S248, S249). Then, the document authentication part 15 carries out checking operation, based on the thus-obtained document meta information, to check as to whether or not the current date/time is within the term of validity of the document as well as whether or not the classification (category) and the target service of the document are those for which transfer is allowed (Step S250). When the authentication has been thus made properly, a SAML response indicating this fact is transmitted to the user extending part 103 (Step S251).

The user extending part 103 notifies the document IO management part 12 of this authentication completion (Step S252), and then, the document IO management part 12 transfers the document image thus scanned to the user extending part 103 (Step S253). Then, the user extending part 103 carries out various sorts of user extending processing, previously customized for the user, on the thus-transferred document image.

The preferable embodiments of the present invention have been described above. There, the specific examples have been used to describe the present invention. However, the present invention is not limited to the above-described embodiments, and variations and modifications may be made without departing from the basic concept of the present invention claimed below.

The present application is based on Japanese Priority Applications Nos. 2006-120914 and 2007-097531, filed on Apr. 25, 2006 and Apr. 3, 2007, respectively, the entire contents of which are hereby incorporated herein by reference.

What is claimed is:

1. A scanned document management system for managing, by a document managing unit, a document image of a document obtained by scanning a paper document and transforming the paper document into electronic data, the document image being managed in association with identification information of the document and document information, the scanned document management system comprising:
   a part that registers, in an identification information management unit, an attribute of the document that is a management object;
   a part that acquires the document image and the document information from the document managing unit based on the identification information of the document to be printed when the document managing unit prints the document being managed;
   a part that acquires the corresponding attribute from the identification information management unit based on the acquired document information;
   a part, using a hardware processor, that registers, in the identification information management unit, the identification information of the document to be printed and the acquired attribute in association with each other;
   a part that issues a document authentication certificate including the identification information of the document to be printed;
   a part that codes the issued document authentication certificate, and prints the document authentication certificate by including the document authentication certificate in the document image to be printed;
   a part that extracts the coded document authentication certificate from the document image acquired by the scanning, when scanning the document;
   a part that acquires the corresponding attribute from the identification information management unit based on the identification information included in the extracted document authentication certificate;
   a part that determines whether authentication is successful based on the acquired attribute, and that allows transfer of the document image acquired by the scanning when the authentication is successful; and
   a part that transfers the document image acquired by the scanning to the document managing unit, based on the allowance.

2. The scanned document management system as claimed in claim 1, further comprising:
   a part that manages a history of printing and scanning the document.

3. The scanned document management system as claimed in claim 1, wherein:
   the attribute includes a document category, a target service and a term of validity, and the transfer is allowed when a time of the authentication is within the term of validity, and the document category and the target service are those for which transfer is allowed.

4. The scanned document management system as claimed in claim 1, further comprising:
   a part that carries out user extending processing in response to the transfer of the document image, allowed from the authentication.

5. The scanned document management system as claimed in claim 1, further comprising:
   a part that absorbs a difference in a communication protocol in transmission/reception of information.

6. A multi-function printing apparatus having functions of managing, by a document managing unit, a document image of a document obtained by scanning a paper document and transforming the paper document into electronic data, the document image being managed in association with identification information of the document and document information, the multi-function printing apparatus comprising:
   a part that registers, in an identification information management unit, an attribute of the document that is a management object;
   a part that acquires the document image and the document information from the document managing unit based on the identification information of the document to be printed when the document managing unit prints the document being managed;
   a part that acquires the corresponding attribute from the identification information management unit based on the acquired document information;
   a part that registers, in the identification information management unit, the identification information of the document to be printed and the acquired attribute in association with each other;
   a part that issues a document authentication certificate including the identification information of the document to be printed;
   a part that codes the issued document authentication certificate, and prints the document authentication certificate by including the document authentication certificate in the document image to be printed;
   a part that extracts the coded document authentication certificate from the document image acquired by the scanning, when scanning the document;
   a part that acquires the corresponding attribute from the identification information management unit based on the identification information included in the extracted document authentication certificate;
   a part that determines whether authentication is successful based on the acquired attribute, and that allows transfer of the document image acquired by the scanning when the authentication is successful; and
   a part that transfers the document image acquired by the scanning to the document managing unit, based on the allowance, wherein
   at least one of the above parts is implemented as hardware or as a hardware/software combination.

7. The multi-function printing apparatus as claimed in claim 6, further comprising:
   a part that manages a history of printing and scanning the document.

8. The multi-function printing apparatus as claimed in claim 6, wherein:
   the attribute includes a document category, a target service and a term of validity, and the transfer is allowed when a time of the authentication is within the term of validity, and the document category and the target service are those for which transfer is allowed.

9. The multi-function printing apparatus as claimed in claim 6, further comprising:
   a part that carries out user extending processing in response to the transfer of the document image, allowed from the authentication.

10. The multi-function printing apparatus as claimed in claim 6, further comprising:
    a part that absorbs a difference in a communication protocol in transmission/reception of information.

11. A scanned document managing method for managing, by a document managing unit, a document image of a document obtained by scanning a paper document and transforming the paper document into electronic data, the document image being managed in association with identification information of the document and document information, the scanned document managing method comprising the steps of:

registering, in an identification information management unit, an attribute of the document that is a management object;

acquiring the document image and the document information from the document managing unit based on the identification information of the document to be printed when the document managing unit prints the document being managed;

acquiring the corresponding attribute from the identification information management unit based on the acquired document information;

registering, in the identification information management unit, the identification information of the document to be printed and the acquired attribute in association with each other;

issuing a document authentication certificate including the identification information of the document to be printed;

coding the issued document authentication certificate, and printing the document authentication certificate by including the document authentication certificate in the document image to be printed;

extracting the coded document authentication certificate from the document image acquired by the scanning, when scanning the document;

acquiring the corresponding attribute from the identification information management unit based on the identification information included in the extracted document authentication certificate;

determining whether authentication is successful based on the acquired attribute, and allowing transfer of the document image acquired by the scanning when the authentication is successful; and transferring the document image acquired by the scanning to the document managing unit, based on the allowance.

12. The scanned document managing method as claimed in claim 11, further comprising the step of:

managing a history of printing and scanning the document.

13. The scanned document managing method as claimed in claim 11, wherein:

the attribute includes a document category, a target service and a term of validity, and the transfer is allowed when a time of the authentication is within the term of validity, and the document category and the target service are those for which transfer is allowed.

14. The scanned document managing method as claimed in claim 11, further comprising the step of:

carrying out user extending processing in response to the transfer of the document image, allowed from the authentication.

15. The scanned document managing method as claimed in claim 11, further comprising the step of:

absorbing a difference in a communication protocol in transmission/reception of information.

16. A non-transitory computer-readable storage medium including computer executable instructions, wherein the instructions, when executed by a computer, cause the computer to perform a method for managing, by a document managing unit, a document image of a document obtained by scanning a paper document and transforming the paper document into electronic data, the method comprising:

registering, in an identification information management unit, an attribute of the document that is a management object;

acquiring the document image and the document information from the document managing unit based on the identification information of the document to be printed when the document managing unit prints the document being managed;

acquiring the corresponding attribute from the identification information management unit based on the acquired document information;

registering, in the identification information management unit, the identification information of the document to be printed and acquired attribute in association with each other;

issuing a document authentication certificate including the identification information of the document to be printed;

coding the issued document authentication certificate and printing the document authentication certificate by including the document authentication certificate in the document image to be printed;

extracting the coded document authentication certificate from the document image acquired by the scanning, when scanning the document;

acquiring the corresponding attribute from the identification information management unit based on the identification information included in the extracted document authentication certificate;

determining whether authentication is successful based on the acquired attribute, and allowing transfer of the document image acquired by the scanning when the authentication is successful; and transferring the document image acquired by the scanning to the document managing unit, based on the allowance.

17. The non-transitory computer-readable storage medium as claimed in claim 16, further comprising:

managing a history of printing and scanning the document.

18. The non-transitory computer-readable storage medium as claimed in claim 16, wherein:

the attribute includes a document category, a target service and a term of validity, and the transfer is allowed when a time of the authentication is within the term of validity, and the document category and the target service are those for which transfer is allowed.

19. The non-transitory computer-readable storage medium as claimed in claim 16, further comprising:

carrying out user extending processing in response to the transfer of the document image, allowed from the authentication.

20. The non-transitory computer-readable storage medium as claimed in claim 16, further comprising:

absorbing a difference in a communication protocol in transmission/reception of information.

* * * * *